United States Patent [19]

Ohkura et al.

[11] Patent Number: 5,737,029
[45] Date of Patent: Apr. 7, 1998

[54] IMAGE RECEPTION CONTROLLER AND METHOD WITH ORDERED DISPLAY OF PREVIOUSLY VIEWED CHANNELS

[75] Inventors: Yukiko Ohkura; Kazumasa Okumura, both of Tokyo; Akira Yamazaki, Chiba; Tomoko Shudo, Kanagawa, all of Japan

[73] Assignee: Sony Corporation, Tokyo, Japan

[21] Appl. No.: 552,868

[22] Filed: Nov. 3, 1995

[30] Foreign Application Priority Data

Nov. 11, 1994 [JP] Japan .................................. 6-277301

[51] Int. Cl.$^6$ ...................................... H04N 5/445
[52] U.S. Cl. ................................ 348/564; 348/569
[58] Field of Search ........................... 348/563, 564, 348/565, 569, 570, 506, 731, 734, 12, 6, 8, 9; H04N 5/44, 5/445

[56] References Cited

U.S. PATENT DOCUMENTS 5,398,074  3/1995  Duffield et al. ..................... 348/569
5,619,249  4/1997  Billock et al. ...................... 348/906

*Primary Examiner*—Michael H. Lee
*Attorney, Agent, or Firm*—Jay H. Maioli

[57] ABSTRACT

A television reception controller enables the viewer to choose a favorite program from among many broadcasting channels easily and swiftly. The controller displays labels of categories that are NEWS, MOVIE, SPORTS, POLITICS and MUSIC on the top row of the display screen and displays pictures of broadcasting channels of the leftmost category, which have been received in the last four weeks, in small frames in the leftmost column of the screen downwardly in the order of the frequency of reception. The controller responds to the horizontal movement of the cursor to rotate the category labels horizontally and responds to the vertical movement of the cursor on the small-frame pictures and the action of selection to display the picture of the selected broadcasting channel in the main frame of the screen.

8 Claims, 26 Drawing Sheets

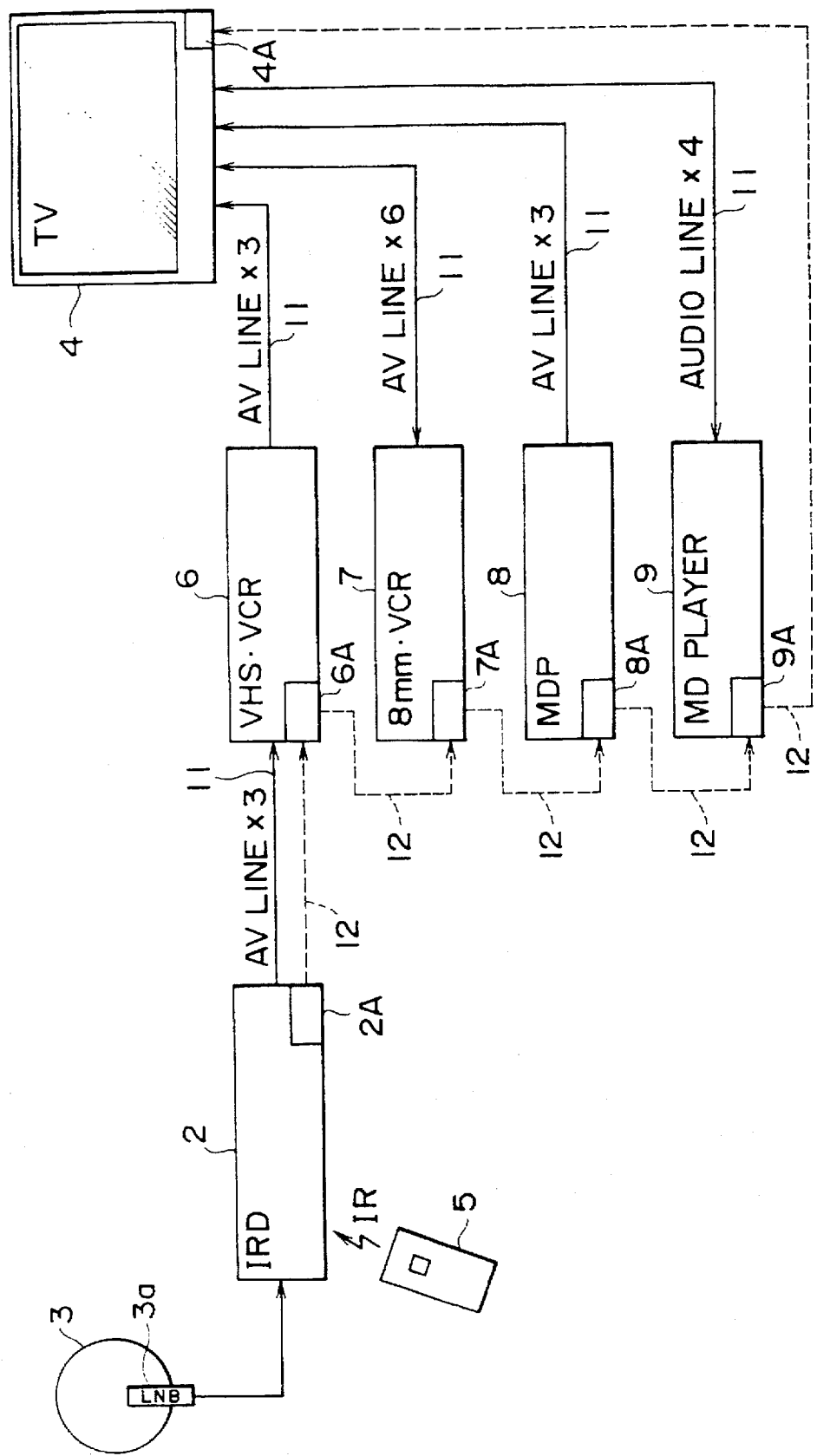

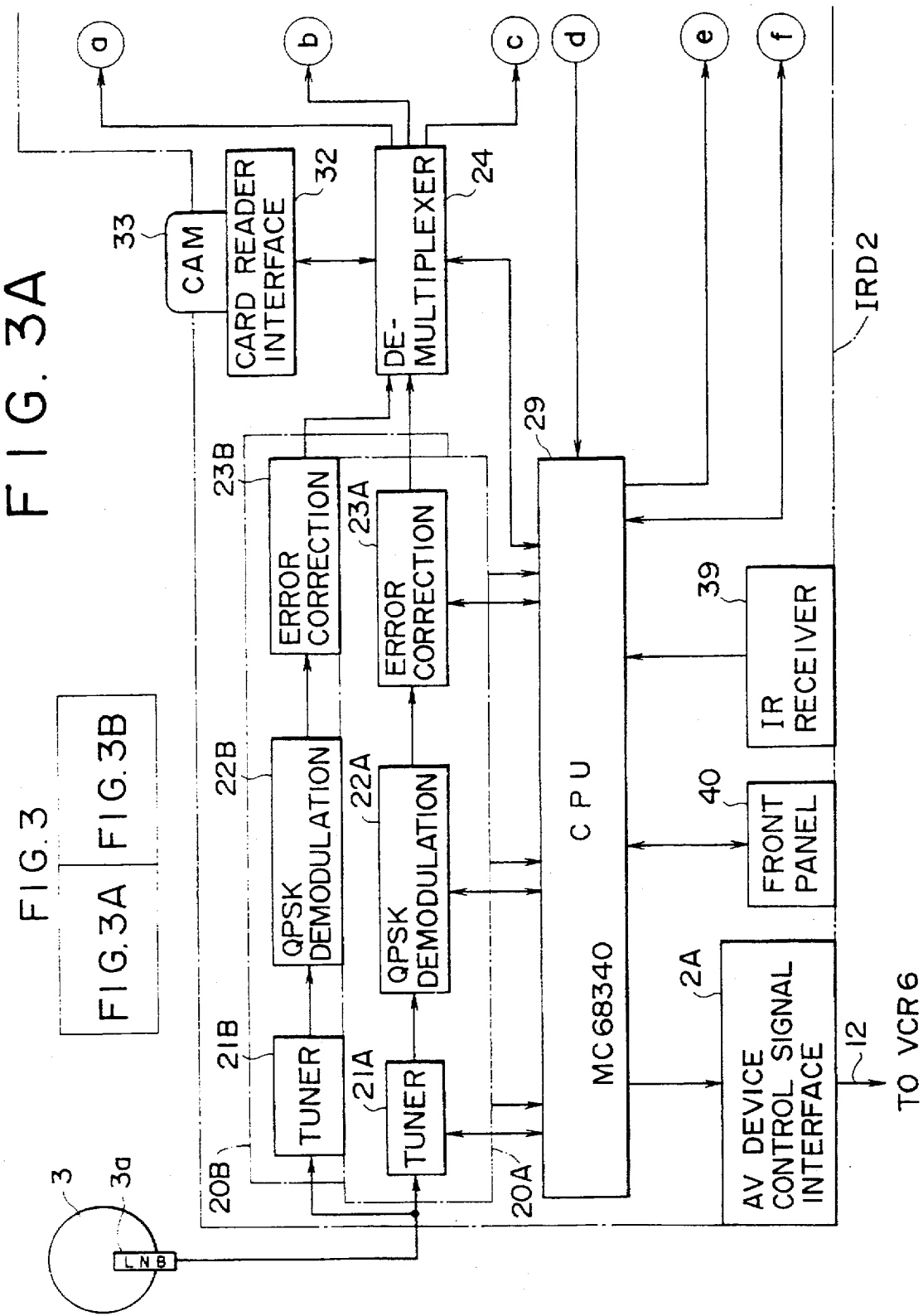

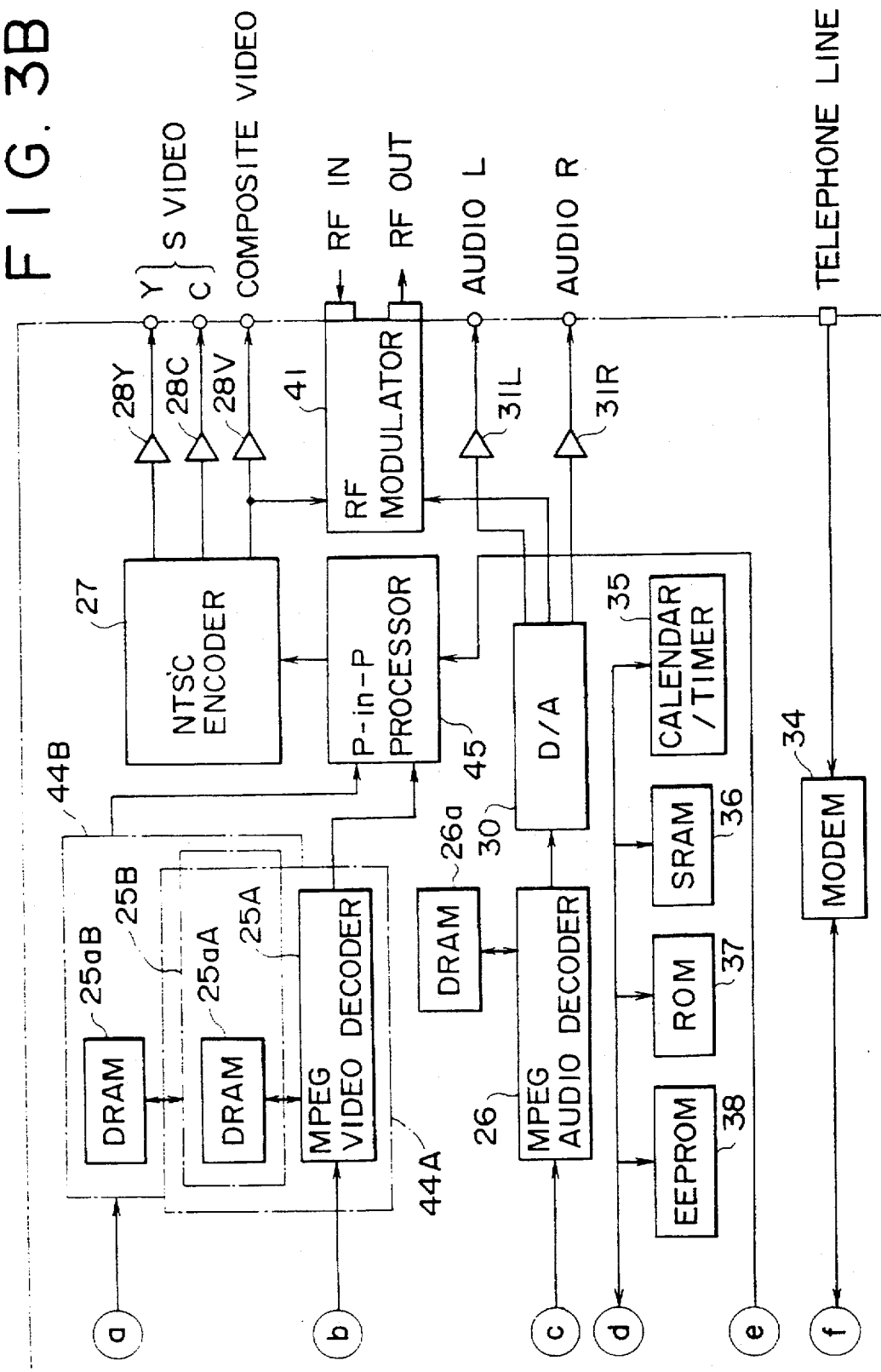

F I G. 9
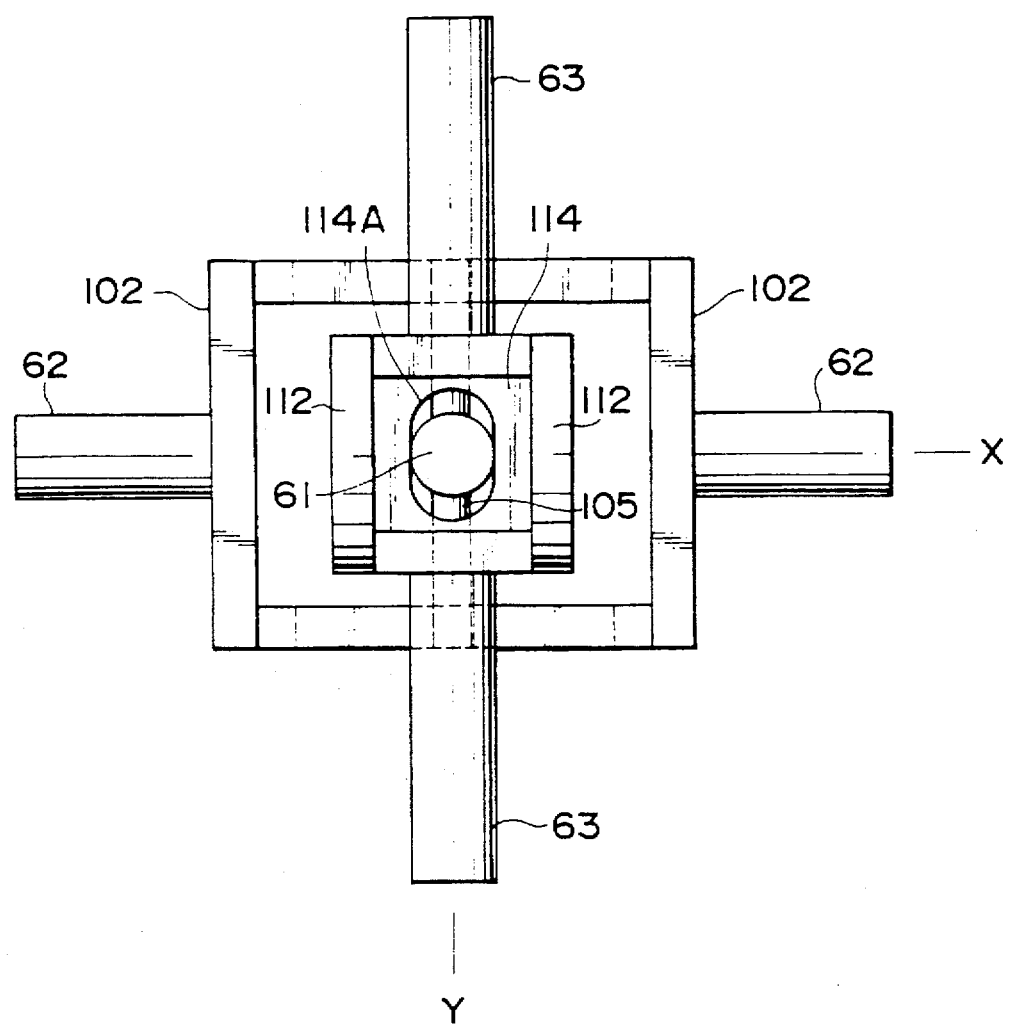

FIG. 12

| TIME BAND | CATEGORY | | $C_1$ NEWS | $C_2$ MOVIE | $C_3$ SPORTS | $C_4$ POLITICS | $C_5$ MUSIC |
|---|---|---|---|---|---|---|---|
| | | TITLE | | | | | |
| 6:00 | CHANNEL N | 1 | 35 | 60 | 95 | 4 | 33 |
| | | 2 | 36 | 93 | 2 | 66 | 13 |
| | | 3 | 25 | 103 | 133 | 71 | 1 |
| | | 4 | 6 | 3 | 134 | 75 | 5 |
| | | 5 | 113 | 7 | 59 | 80 | 6 |
| 6:30 | CHANNEL N | 1 | 35 | 7 | 95 | 66 | 155 |
| | | 2 | 25 | 103 | 2 | 4 | 13 |
| | | 3 | 6 | 60 | 59 | 80 | 1 |
| | | 4 | 113 | 93 | 133 | 71 | 5 |
| | | 5 | 36 | 3 | 34 | 90 | 33 |
| 7:00 | | | | | | | |

5,737,029

IMAGE RECEPTION CONTROLLER AND METHOD WITH ORDERED DISPLAY OF PREVIOUSLY VIEWED CHANNELS

BACKGROUND OF THE INVENTION

1. Field of the Invention

The present invention relates to an image reception controller and a method of image reception control suitable for receiving a large number of broadcasting channels broadcast by way of a broadcasting satellite.

2. Description of Related Art

Owing to the recent advancement of the highly efficient coding technique typified by MPEG (Moving Picture Experts Group), the conversion of broadcasting to the multi-channel broadcasting system is under way for the cable television (CATV) and digital satellite system (DSS) (DSS is a trademark of Hughes Communications Co.). The multi-channel broadcasting system includes 150 to 175 channels, for example, and it compels the user to perform an awkward operation for choosing a channel from among such a large number of channels.

In dealing with this matter, there has been proposed a device for displaying pictures of programs of multiple broadcasting channels in small frames that are divided areas of the entire screen of a television receiver, as shown in FIG. 25 for example, so that the user can easily know the contents of programs of multiple channels on a real-time basis. The user watches the small-frame pictures and enters a channel number of the intended program, and the selected channel is received and displayed on the entire screen.

In order to relieve the user of the operation of entering a channel number to choose a broadcasting channel in the above-mentioned device, there has been proposed a device for receiving a broadcasting channel that has been received most frequently in the time band of user's channel selection based on cumulated data of channel selection in the past.

However, the user may intend to choose a broadcasting channel other than one that has been selected most frequently in the past in the time band of channel selection, and in this case the unsatisfactory operability is not overcome.

SUMMARY OF THE INVENTION

The present invention is intended to cope with the foregoing situation, and its object is to improve the operability of channel selection so that the user can choose an intended broadcasting channel swiftly.

In order to achieve the above objective, the image reception controller based on this invention comprises a reception means (e.g., tuners 21A and 21B in FIG. 3) which receives a specified broadcasting channel, a memory means (e.g., EEPROM 38 in FIG. 3) which stores a record of reception of broadcasting channels, inclusive of at least categories of broadcasting channels, received by the reception means in a prescribed period in the past, a reception control means (e.g., step 25 on the flowchart of FIG. 14) which operates on the reception means to receive broadcasting channels that belong to a category in the reception record in response to an external command of a certain operational mode (e.g., favorite program guide mode), and a display control means (e.g., MPEG video decoder 25B in FIG. 3) which displays labels of categories along one of the horizontal axis and vertical axis of the display screen and displays pictures of the broadcasting channels of the category in small frames along another axis.

The display control means is designed to display the category labels on the top row or bottom row of the display screen and display the small-frame pictures in the leftmost column or rightmost column of the display screen (e.g., display of FIG. 16).

The display control means is designed to display additionally a cursor (e.g., cursor K in FIG. 16) used to point to a category label or a small-frame picture to be selected.

In this case, the controller has a cursor shift means (e.g., operation knob 52 for moving the cursor up, down, right or left as shown in FIG. 4). The display control means may rotate the category labels horizontally, instead of moving the cursor horizontally, in response to the operation for cursor movement.

The controller has a designation means (e.g., operation knob 52 shown in FIG. 4) which is operated to designate a small-frame picture that is pointed by the cursor.

The cursor shift means and small frame designation means may be designed to be operated with one finger successively.

The method of image reception control based on this invention stores a record of reception of broadcasting channels, inclusive of at least categories of broadcasting channels, which have been received in a prescribed period in the past, receives broadcasting channels that belong to a category in the reception record in response to an external command of a certain mode (e.g., favorite program guide mode), and displays labels of categories along one of the horizontal axis and vertical axis of the display screen and displays pictures of the broadcasting channels of the category in small frames along another axis.

According to the image reception controller and the method of image reception control arranged as mentioned above, the category labels are displayed along one of the horizontal axis and vertical axis of the display screen and pictures of broadcasting channels of a category that are broadcast currently are displayed in small frames along another axis. Consequently, the user can choose an intended broadcasting channel easily and swiftly.

BRIEF DESCRIPTION OF THE DRAWINGS

FIG. 2 is a block diagram showing the electrical connection of the AV system shown in FIG. 1;

FIG. 3 is a block diagram showing the arrangement of the intergrated receiver/decoder shown in FIG. 1;

FIG. 9 is a plan view showing the structure of the small stick controller shown in FIG. 6;

FIG. 12 is a table showing an example of the favorite program guide list created by the process shown in FIG. 11;

DESCRIPTION OF THE PREFERRED EMBODIMENTS

Figure 1:
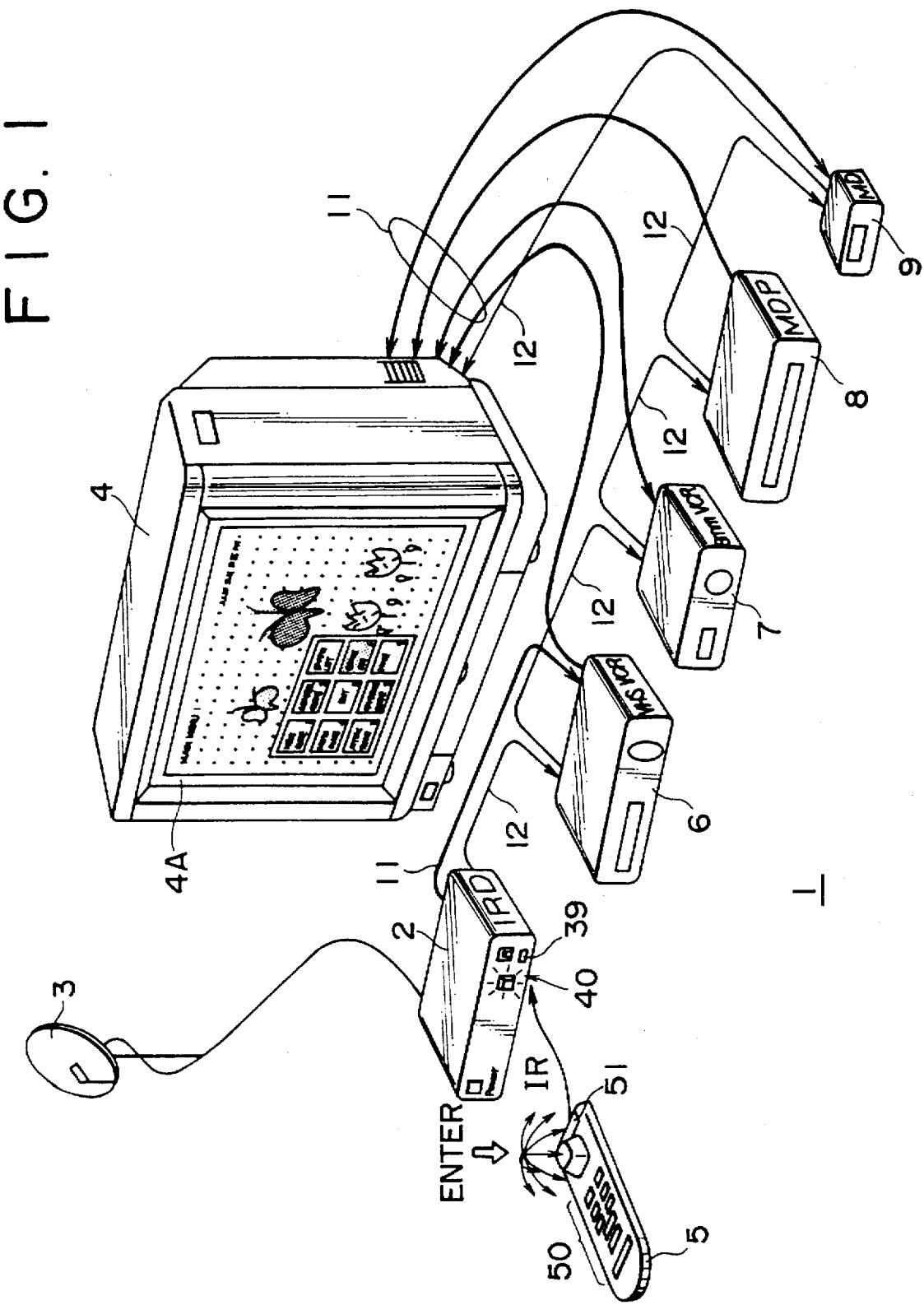
FIG. 1 is a perspective view of an AV (Audio/Video) system based on the application of the inventive image reception controller.

FIG. 1 shows the configuration of an AV (Audio/Video) system based on the application of the inventive image reception controller. The AV system 1 consists of an IRD (Integrated Receiver/Decoder) 2 which demodulates broadcast signals received by a parabolic antenna 3 from a broadcasting satellite (not shown), a VHS-based VCR (Video Cassette Recorder) 6, an 8-mm VCR 7, a MDP (Multi-Disc Player) 8, an MD (Mini Disc) player 9, and a monitor unit 4.

The VCRs 6 and 7, MDP 8 and MD player 9 are connected to the monitor unit 4 by AV lines 11, with the IRD 2 and VCR 6 being connected together by an AV line 11, and these devices are further connected in series by control lines 12.

The IRD 2 is designed to receive commands carried by an infrared (IR) light beam from a remote commander 5. Specifically, when the user presses one of keys 50 on the remote commander 5, a corresponding light signal is emitted from the IR transmitter 51, and it is received by the IR receiver 39 of the IRD 2. The IRD 2 has a front panel 40, on which are laid out various keys, by which the user can directly enter the same commands as those issued by operating the remote commander 5.

FIG. 2 shows the electrical connection of the AV system 1. The parabolic antenna 3 includes an LNB (Low Noise Block) downconverter 3a, which converts the signal from the broadcasting satellite into a signal of a prescribed frequency and feeds it to the IRD 2. The IRD 2 has its output fed to the VCR 6 over the AV line 11 made up of three wires. The VCR 6 has its output fed to the monitor unit 4 over the AV line 11 made up of three wires. The VCR 7, MDP 8 and MD player 9 are connected to the monitor unit 4 by the AV lines made up of six, three and four wires, respectively.

The IRD 2, VCRs 6 and 7, MDP 8, MD player 9 and monitor unit 4 have AV device control signal interface circuits 2A, 6A, 7A, 8A, 9A and 4A, respectively, and these circuits are connected in series by the control lines 12 of wired SIRCS (Sony Infrared Remote Control System).

FIG. 3 shows the internal circuit arrangement of the IRD 2. The RF signal produced by the LNB 3a of the parabolic antenna 3 is fed to a tuner 21A in a front-end module 20A, and the signal is demodulated. The tuner 21A has its output fed to a QPSK demodulation circuit 22A, by which the signal is demodulated using QPSK demodulation. The QPSK demodulation circuit 22A has its output fed to an error correction circuit 23A, by which an error in the signal is detected, corrected or modified. There is another front-end module 20B including a tuner 21B, QPSK demodulation circuit 22B and error correction circuit 23B, and the same signal processing as of the front-end module 20A is carried out independently.

A CAM (Conditional Access Module) 33 which includes a CPU, ROM and RAM on an IC card stores a decryption program and a key used to decrypt the encrypted broadcasting signal from the broadcasting satellite. The decryption key is read out of the CAM 33 through a card reader interface 32 and it is passed to a demultiplexer 24, by which the encrypted signal is decrypted. The CAM 33 also stores charging information.

The demultiplexer 24 receives the output signals of the error correction circuits 23A and 23B in the front-end modules 20A and 20B, and feeds decrypted video signals to decoder modules 44A and 44B which operate independently and a decrypted audio signal to an MPEG audio decoder 26. The decoder modules 44A and 44B have MPEG video decoders 25A and 25B and DRAMs 25aA and 25aB correspondingly.

The MPEG video decoders 25A and 25B load the input digital video signals into the DRAMs 25aA and 25aB, and implement the decoding process for the video signals which are compressed in the MPEG form. Decoded video signals are fed by way of a picture-in-picture (P in P) processor 45 to an NTSC encoder 27, by which the signals are converted into a luminance signal (Y), chrominance signal (C) and composite signal (V). The luminance signal and chrominance signal are fed through buffer amplifiers 28Y and 28C and sent out as S video signals. The composite signal is sent out through a buffer amplifier 28V.

The MPEG audio decoder 26 loads the digital audio signal from the demultiplexer 24 into a DRAM 26a, and implements the decoding process for the audio signal which is compressed in the MPEG form. The decoded audio signal is converted into analog signals of the right and left channels by a D/A converter 30, and these signals are sent out through buffer amplifiers 31R and 31L, respectively.

An RF modulator 41 converts the composite signal from the NTSC encoder 27 and the audio signal from the D/A converter 30 into RF signals, and sends out the resulting RF signals. The RF modulator 41 also receives RF signals of the NTSC form from other AV equipment such as a CATV cable box (not shown), and feeds the signals intact to other AV devices such as the VCR 6.

The output video signals and audio signals of the IRD 2 are sent to the VCR 6 over the AV line 11.

The CPU (Central Processing Unit) 29 implements various processings in accordance with programs stored in a ROM 37. The CPU 29 controls the tuners 21A and 21B, QPSK demodulation circuits 22A and 22B, error correction circuits 23A and 23B, and picture-in-picture processor 45.

The CPU 29 also controls the AV device control signal interface circuit 2A to send and receive control signals to/from other AV devices over the control line 12.

The user can enter commands directly to the CPU 29 by operating keys (not shown) on the front panel 40, or can enter the same commands to the CPU 29 by operating the remote commander 5, in which case infrared light signals are emitted by the IR transmitter 51 and received by the IR receiver 39.

The CPU 29 operates to introduce signals other than the video signals and audio signals to be fed to the demultiplexer 24, e.g., EPG (Electrical Program Guide) information sent together with the video signals and audio signals from the broadcasting satellite, and store the information in a certain format in an SRAM (Static Random Access Memory) 36. The EPG information includes channel numbers, titles, broadcasting times and categories of programs that will be broadcast within the next several tens of hours from the present. The EPG information is transmitted frequently, and the SRAM 36 always contains the latest information.

The EEPROM (Electrically Erasable Programmable Read Only Memory) 38 stores data such as the favorite program guide list (which will be explained later in regard to FIG. 12) that needs to be retained even during the power-off state of the controller. The CPU 29 compares the time stamp, which is separated from the received signal by the demultiplexer 24, with time information provided by a calendar/timer 35, and controls the MPEG video decoders 25A and 25B and MPEG audio decoder 26 so that their decoding processes take place at the correct timing.

The CPU 29 further controls the MPEG video decoders 25A and 25B to generate OSD (On-Screen Display) data. The MPEG video decoders 25A and 25B generate OSD data, and write and read out the OSD data to/form the DRAMs 25aA and 25aB under control of the CPU 29, thereby displaying characters or figures on the monitor unit 4. A modem 34 is used to transact data with external systems over the telephone line under control of the CPU 29.

Figure 4:
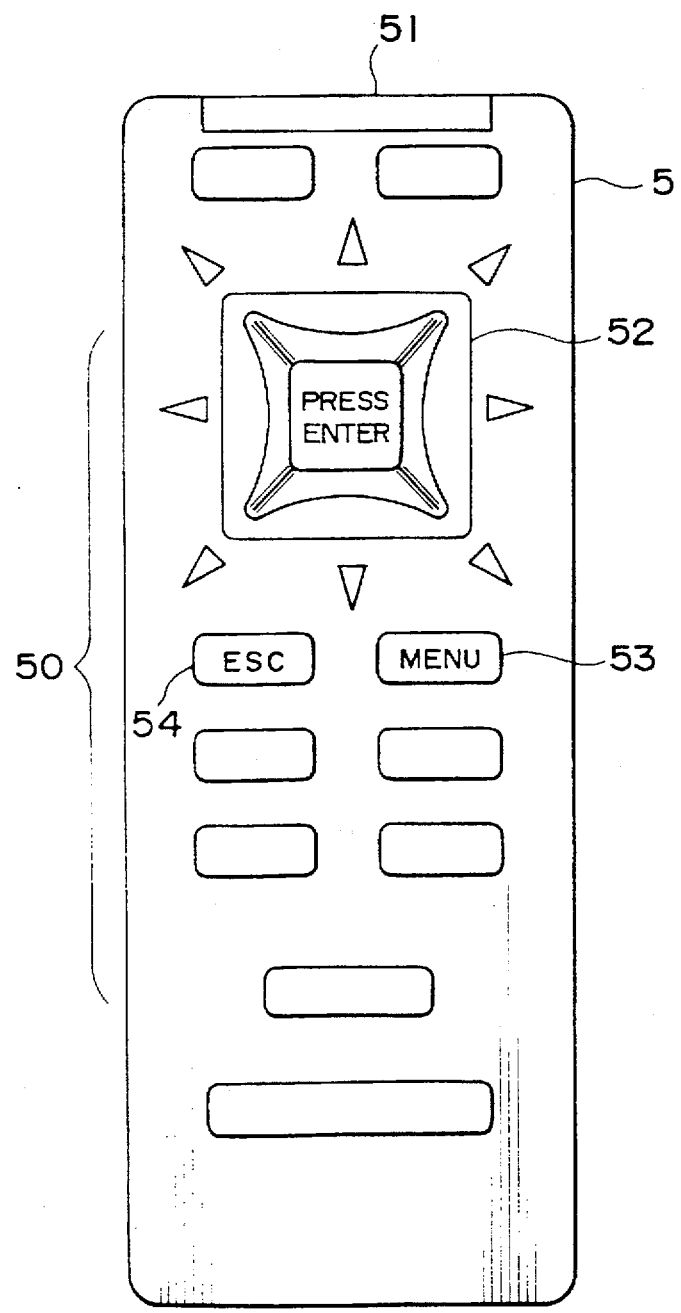
FIG. 4 is a plan view of the remote commander 5 shown in FIG. 1.

FIG. 4 shows the layout of keys 50 on the remote commander 5, which has the IR transmitter 51 located at the upper end. The operation knob 52 which is located below the IR transmitter 51 has eight tilting directions that are up, down, right, left, up-right, down-right, down-left, and up-left, and the user can tilt the knob in one of these directions. The operation knob 52 also has a function as an Enter key by being depressed perpendicularly to the top surface. Accordingly, the user can take a directing action in one direction and subsequently depress the Enter key with one finger which is kept placed on the knob.

Located at a position below and to the right of the operation knob 52 is a Menu key 53, which is used to display a menu on the monitor unit 4. Located on the left of the Menu key 53 is an Escape (ESC) key 54, which is used to return the control sequence to the beginning. Explanation of other keys 50 that are not related directly to the present invention is omitted.

Figure 5:
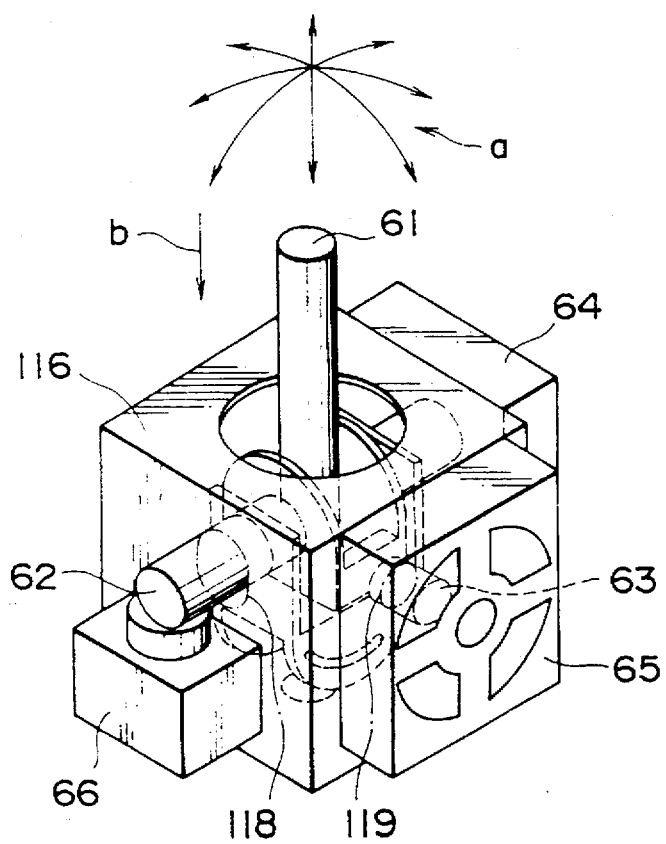
FIG. 5 is a perspective view showing the structure of a small stick controller used to detect the operation of the operation knob 52 shown in FIG. 4.
Figure 6:
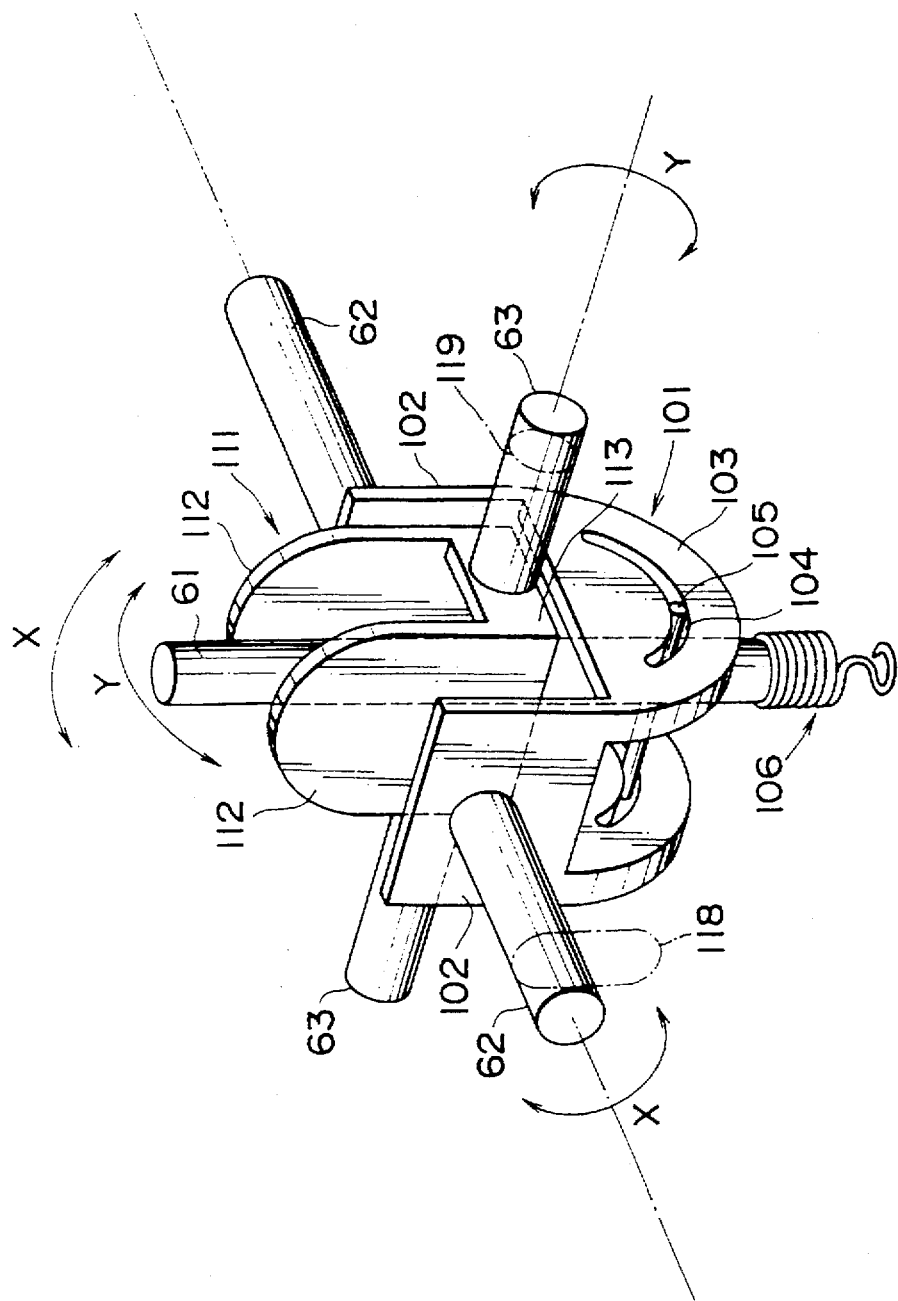
FIG. 6 is a perspective view showing the internal structure of the small stick controller shown in FIG. 5.
Figure 7:
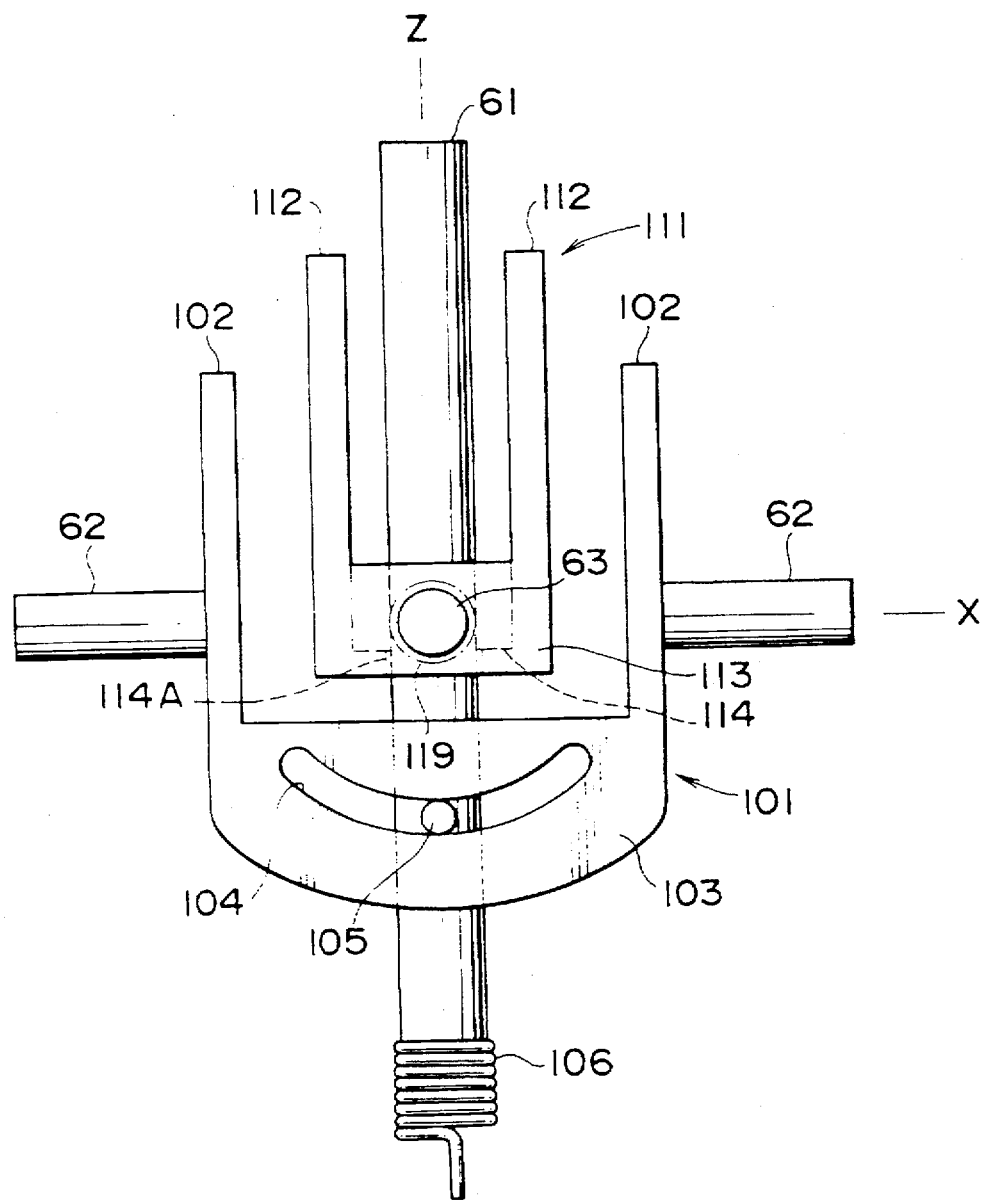
FIG. 7 is a front view showing the structure of the small stick controller shown in FIG. 6.
Figure 8:
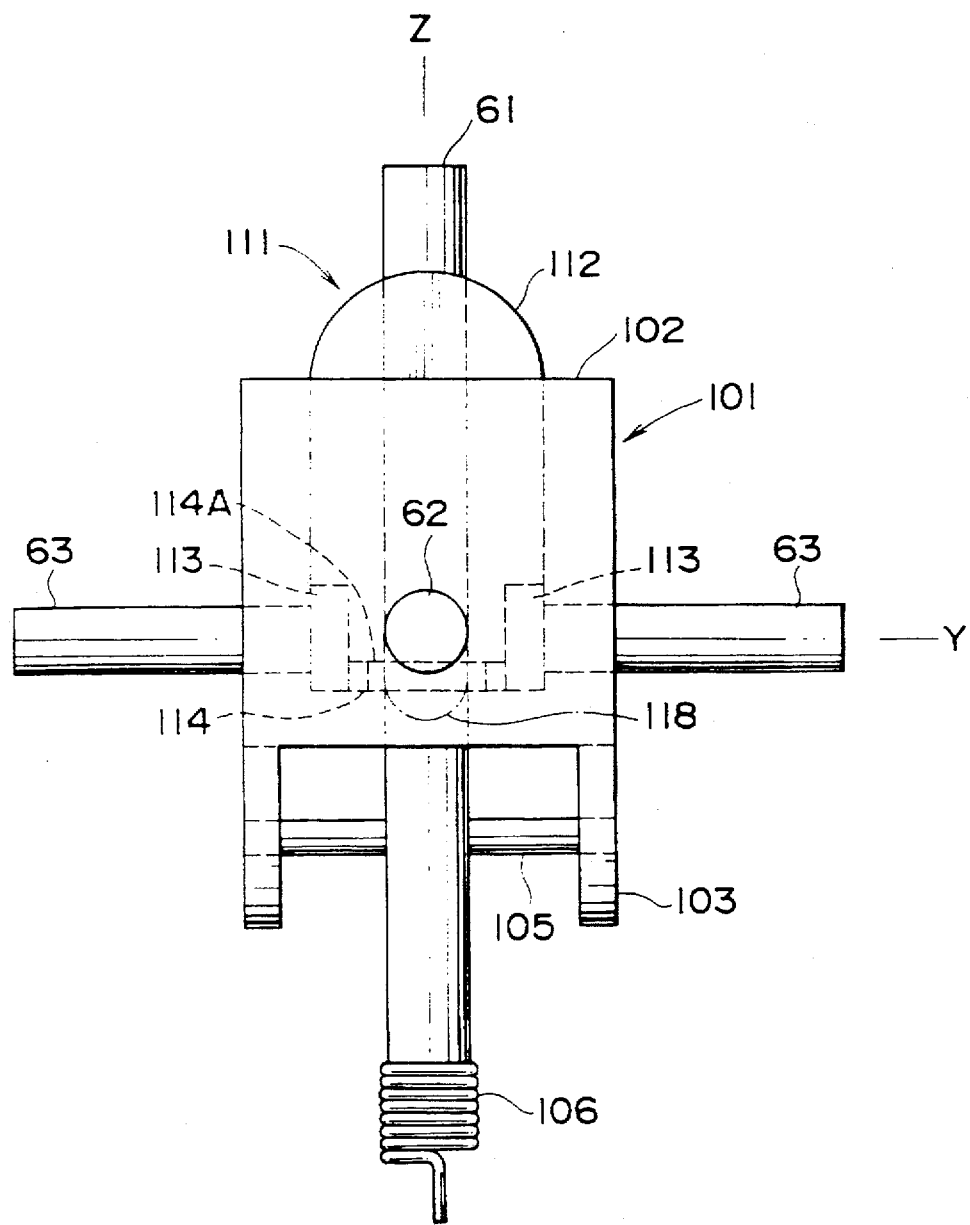
FIG. 8 is a right-hand side view showing the structure of the small stick controller shown in FIG. 6.

FIG. 5 through FIG. 9 show the structure of the mechanism for detecting the operation of the operation knob 52. FIG. 5 shows a small stick controller located beneath the operation knob 52 inside the remote commander 5. A stick 61 is coupled to the operation knob 52 which is made of soft resin. Accordingly, the stick 61 is tilted in one of eight directions as shown by arrows a or moved perpendicularly as shown by arrow b by the operation of the operation knob 52.

The stick 61 has at a lower position a pin 105 which is planted perpendicularly through it. Both ends of the pin 105 are inserted in slots 104 formed in guide plates 103, which are perpendicular to the y-axis direction, of an outer member 101 so that the pin 105 is guided by the slots 104. The outer member 101 further includes side plates 102 which are perpendicular to the x-axis direction, and shafts 62 are planted on the side plates 102 to extend in the x-axis direction.

An inner member 111 is located inside the outer member 101. The inner member 111 has in its bottom plate 114 the formation of an opening 114A which is elongated in the y-axis direction as shown in FIG. 9, and the stick 61 is running through the opening 114A. The inner member 111 has side plates 112, which confront each other, are situated perpendicularly to the x-axis direction, and coupling plates 113 of smaller vertical dimension, which confront each other, are situated perpendicularly to the y-axis direction. Shafts 63 are planted on the coupling plates 113 to extend in the y-axis direction. The slots 104 formed in the guide plates 103 of the outer member 101 are formed on arcs having centers located on the center line of the shafts 63.

The small stick controller shown in FIG. 6 through FIG. 9 is placed in a housing 116 shown in Fig. 5, with the shafts 62 and 63 extending outwardly through openings 118 and 119 formed in the side walls of the housing 116. The opening 119 is circular and has a diameter virtually equal to or slightly greater than the shaft diameter, whereas the opening 118 is elongated in the z-axis direction. On the outer walls of the housing 116, there are attached a variable resistor 64 having its slider coupled with the end of one shaft 62 and a push-down switch 66 located under another shaft 62. On the outer wall of the housing 116 perpendicular to the y-axis direction, there is attached a variable resistor 65 having its slider coupled with the end of the shaft 63.

When the stick 61 is tilted on the x-axis, the outer member 101 which is coupled with the guide plates 103 by the pin 105 turns around the shaft 62 (x-axis). At this time, the inner member 111 is stationary because of the formation of the opening 114A which is elongated in the y-axis direction in the bottom plate 114.

When the stick 61 is tilted on the y-axis, the inner member 111 turns around the shaft 63 (y-axis) because of the presence of the opening 114A having the x-axis dimension virtually equal to the stick diameter. At this time, the pin 105 is guided by the slots 104 which are formed on arcs centered by the shaft 63. Also at this time, the outer member 101 is stationary because of a sufficient clearance provided between the side plates 112 of the inner member 111 and the side plates 102 of the outer member 101.

When the stick 61 is tilted on the x-axis and y-axis simultaneously, the inner member 111 turns around the y-axis and the outer member 101 turns the x-axis simultaneously.

The stick 61 has its lower end coupled to a return spring 106 so that when the stick 61 is freed, it returns to the neutral (perpendicular) position by using the spring force.

Turning of the shaft 62 around the x-axis by the tilting operation of the stick 61 on the x-axis causes the variable resistor 64 to vary the resistance value, and accordingly the direction and amount of turn of the stick 61 around the x-axis can be detected from the resistance value. Similarly, turning of the shaft 63 around the y-axis by the tilting operation of the stick 61 on the y-axis causes the variable resistor 65 to vary the resistance value, and accordingly the direction and amount of turn of the stick 61 around the y-axis can be detected from the resistance value. In this manner, individual operations of the stick 61 in the eight tilt directions indicated by arrows a in FIG. 5 are detected.

When the stick 61 is pushed down as indicated by arrow b in FIG. 5, the inner member 111 does not move since the stick 61 runs freely through the opening 114A formed in its bottom plate 114, whereas the outer member 101 goes down together with the stick 61 by being pushed at the openings 104 of its guide plates 103 by the pin 105 planted through the stick 61. The vertical movement of the outer member 101 is guided by the engagement of the shafts 62 and the vertically elongated openings 118 of the housing 116. When the shaft 62 reaches the prescribed position, it operates the switch 66 to turn it on (or off), and the push-down operation of the stick 61 is detected. When the stick 61 is freed, it goes up to the neutral position by using the spring force of a spring (not shown) incorporated in the switch 66.

Figure 10:
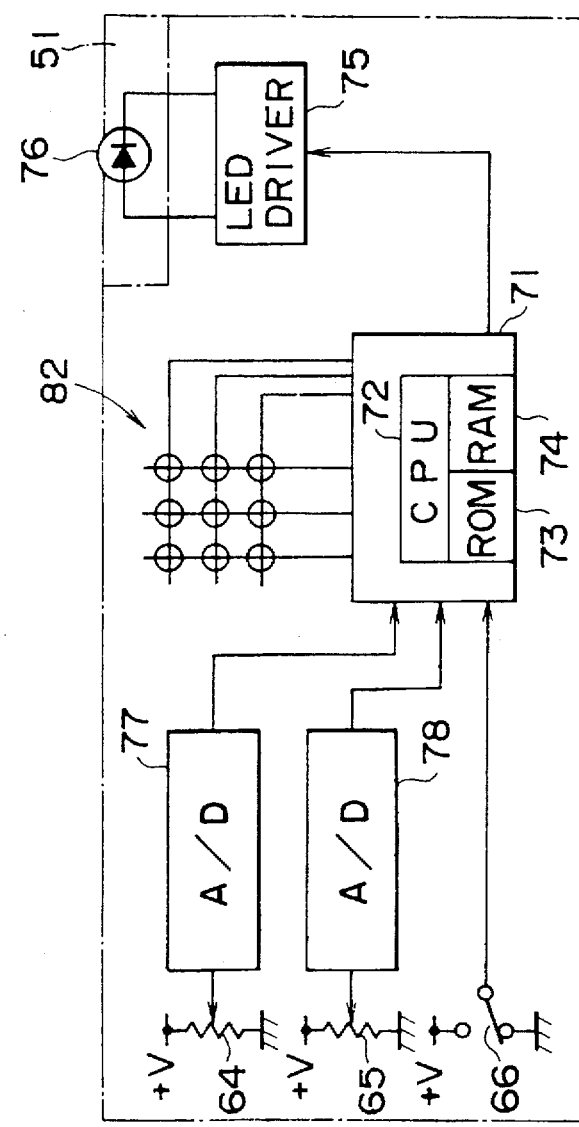
FIG. 10 is a block diagram showing the internal circuit arrangement of the remote commander 5 shown in FIG. 4.

FIG. 10 shows an example of the internal arrangement of the remote commander 5. A microcomputer 71 includes a ROM 73 which stores programs, a CPU 72 which implements various processings in accordance with the programs in the ROM 73, and a RAM 74 which holds data during the execution of programs by the CPU 72. The microcomputer 71 is connected with the keys 50 shown in FIG. 4 in a key matrix configuration 82 so that it detects the operation of every key.

An A/D converter 77 converts the resistance value of the variable resistor 64 into digital data indicative of the rotational amount of the stick 61 around the x-axis, and the data is fed to the microcomputer 71. Another A/D converter 78 converts the resistance value of the variable resistor 65 into digital data indicative of the rotational amount of the stick 61 around the y-axis, and the data is fed to the microcomputer 71. The switch 66 has its turn-on (or turn off) signal, indicative of the vertical operation of the stick 61, fed to the microcomputer 71. The microcomputer 71 operates on the LED driver 75 to activate the LED 76 in the IR transmitter 51 thereby to produce an infrared light signal.

Next, the operation of the IRD 2 shown in FIG. 3 will be explained.

The IRD 2 receives a certain broadcasting channel, and the picture is displayed on the monitor unit 4. Specifically, the signal tuned by the main-frame tuner 21A is rendered the QPSK demodulation by the QPSK demodulation circuit 22A, processed for error correction by the error correction circuit 23A, and fed to the demultiplexer 24. The demultiplexer 24 separates the signal into a video signal and an audio signal, and feeds the video signal to the MPEG video decoder 25A in the main-frame decoder module 44A and the audio signal to the MPEG audio decoder 26.

The MPEG video decoder 25A decodes the video signal, which is compressed in the MPEG form, and feeds the decoded signal by way of the picture-in-picture processor 45 to the NTSC encoder 27. The NTSC encoder 27 converts the signal into video signals of the NTSC form. The resulting video signals are delivered through the buffer amplifiers 28Y,28C and 28V to the monitor unit 4, by which the picture is displayed.

The MPEG audio decoder 26 decodes the audio signal, which is compressed in the MPEG form, and feeds the decoded signal to the D/A converter 30. The resulting analog audio signals from the D/A converter 30 are delivered through the buffer amplifiers 31L and 31R to the monitor unit 4, by which the sounds are released.

Figure 11:
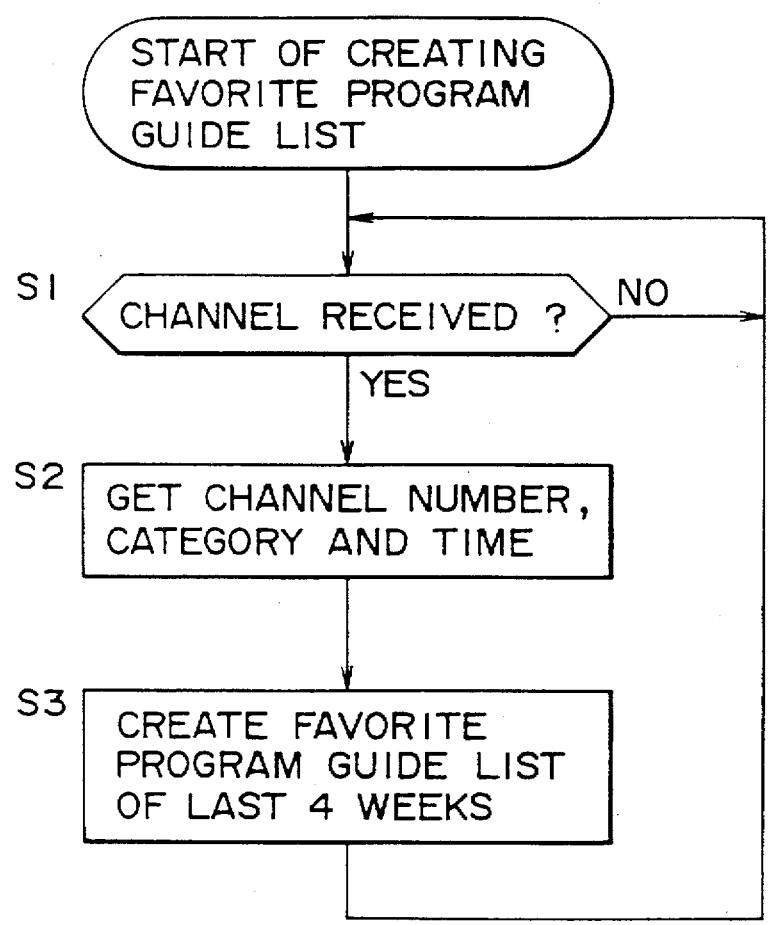
FIG. 11 is a flowchart explaining the process of creation of a favorite program guide list.

During the operation of the video and audio circuits described above, the CPU 29 implements the favorite program guide list creating process as shown by the flowchart of FIG. 11. The first step S1 tests whether or not the tuner 21A is receiving a certain broadcasting channel. The step S1 is repeated until the channel is received, or on detecting the reception of the channel, the sequence proceeds to step S2 to fetch data of the channel number, time and category of the received broadcasting channel. Data of the channel number and category are provided as EPG by the SRAM 36, and data of time is provided by the calendar/timer 36.

The next step 3 creates a favorite program guide list of the last four weeks and stores the list in the EEPROM 38. The favorite program guide list reveals the affair as to how often the user has watched programs of what category in each time band. An example of the favorite program guide list shown in FIG. 12 has rows of 30-minute time bands starting at 6:00 and columns of five categories that are news, movie, sports, politics and music. Each 30-minute time band has five entries of channel numbers, in which are recorded five broadcasting channels of each category that have been received in the last four weeks in the order of the frequency of reception. The record of this example reveals that the user has watched news programs in the time band of 6:00–6:30 through channels 35,36,25,6 and 113 in this order of frequency.

In creating the favorite program guide list, it is desirable and possible to avoid the counting of broadcasting channels that are received for a short duration, e.g., less than five minutes, when the user switches the channel or browses through channels.

Figure 13:
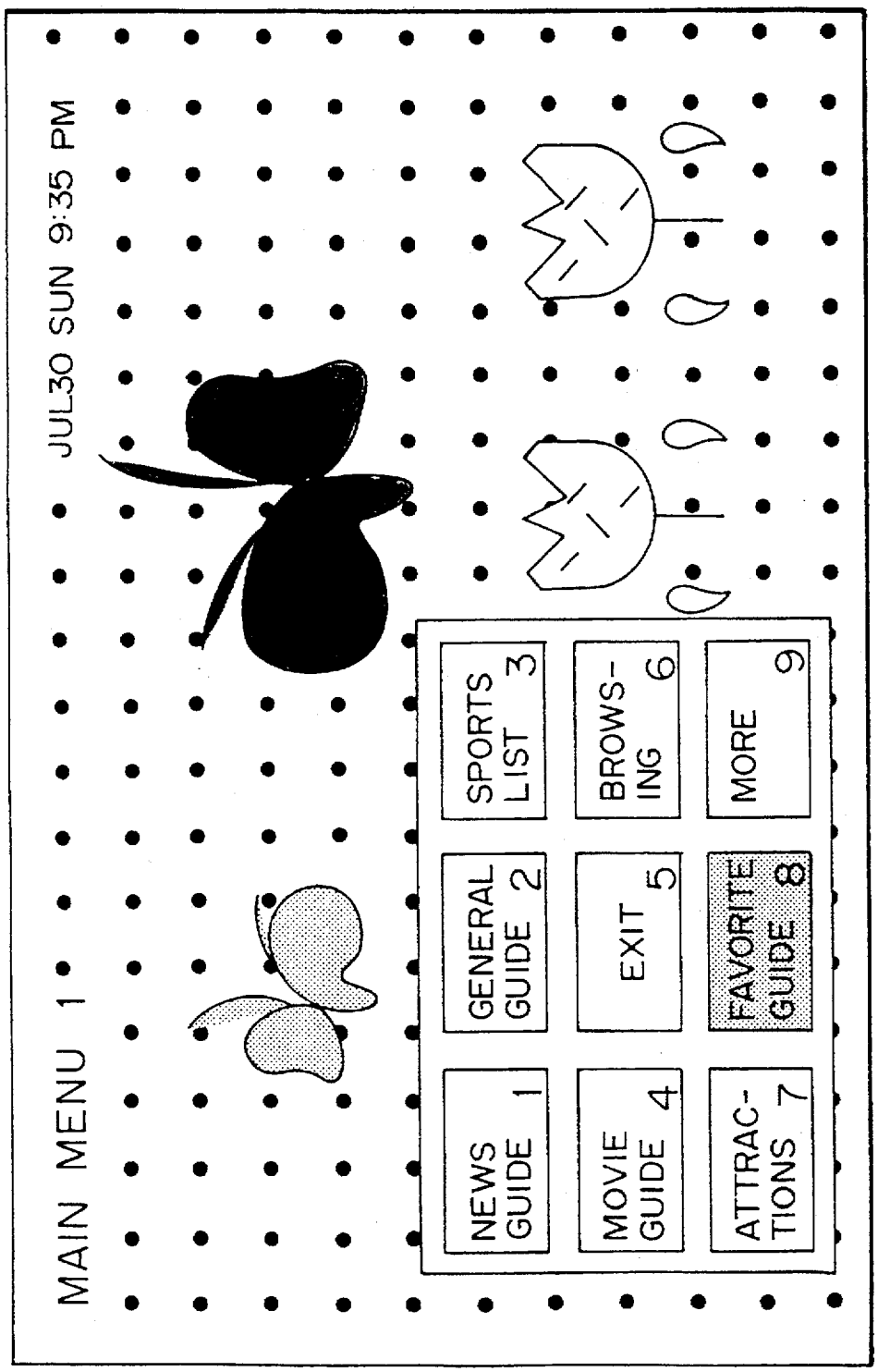
FIG. 13 is a diagram showing an example of display of the operational guidance (menu)

When the user presses the Menu key 53 on the remote commander 5, the CPU 29 operates on the MPEG video decoder 25A to display a menu as shown in FIG. 13 on the monitor unit 4. The displayed menu includes nine labels of function keys numbered from 1 to 9. Key #1 through key #8 are used by the user to choose a function from among the NEWS GUIDE, GENERAL GUIDE, SPORTS GUIDE, MOVIE GUIDE, EXIT OF MENU, BROWSING, ATTRACTION, and FAVORITE GUIDE. Key #9 is used to display the second page of the menu.

Figure 14:
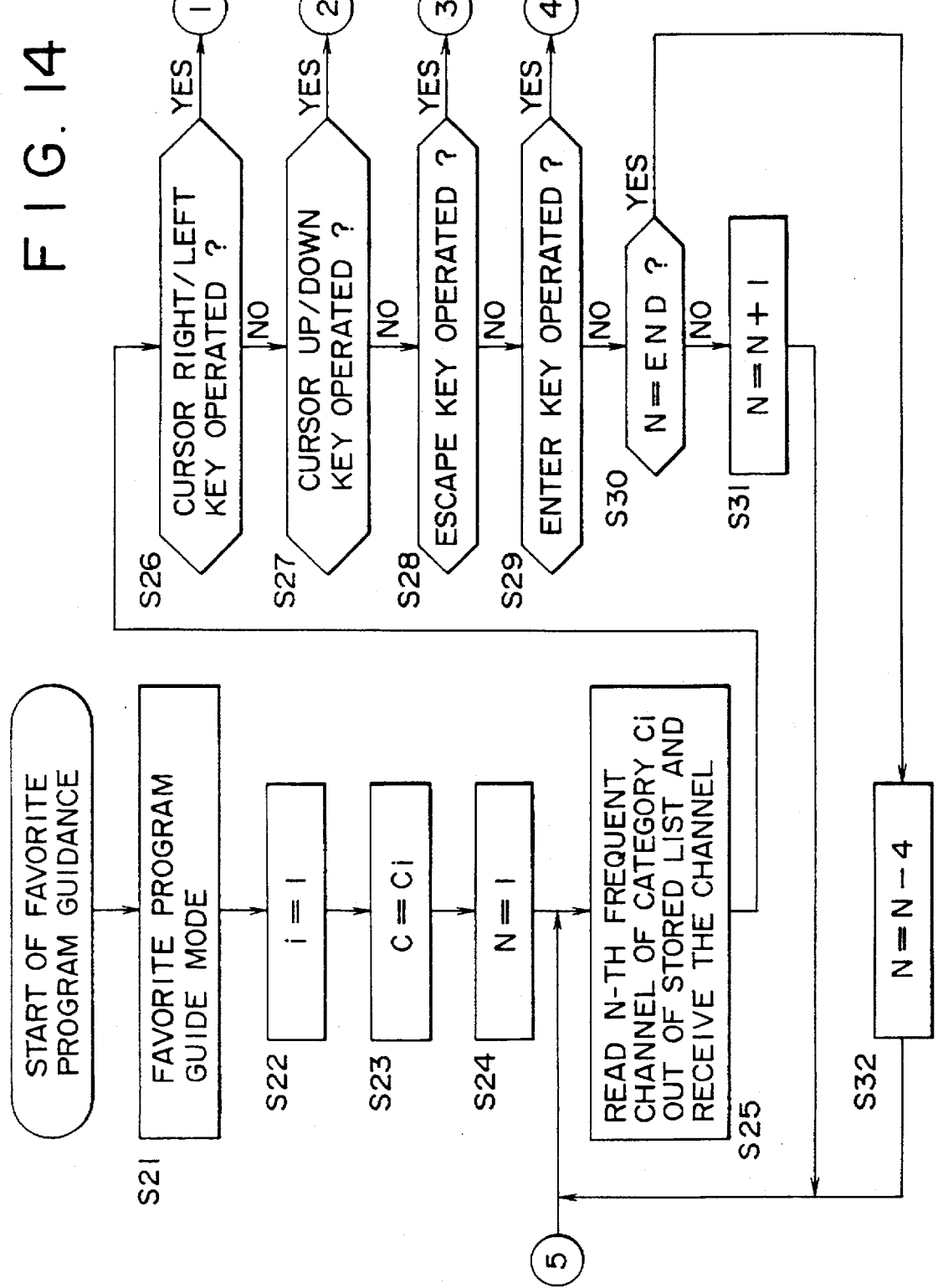
FIG. 14 is a flowchart explaining the process of favorite program guidance.
Figure 15:
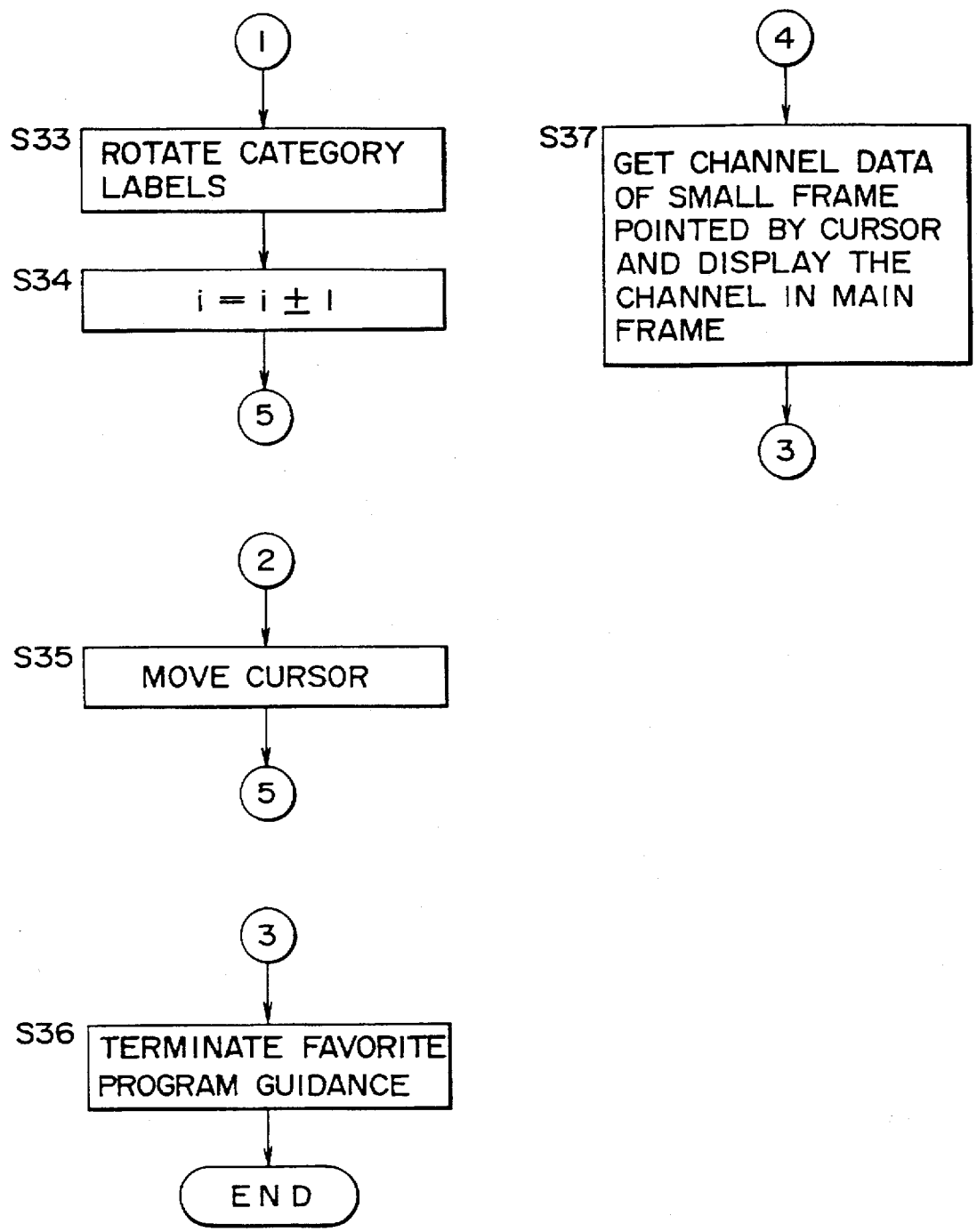
FIG. 15 is a flowchart which is the continuation of FIG. 14.

Next, the process which takes place when the user points the key #8 for FAVORITE GUIDE on the menu shown in FIG. 13 will be explained on the flowcharts of FIG. 14 and FIG. 15.

Initially, the user presses the Menu key 53 on the remote commander 5 to display the menu shown in FIG. 13. The user operates the operation knob 52 to move the cursor, which is the highlighted state of the pointed key in the example of FIG. 13. With the cursor located on the key #8 of FAVORITE GUIDE, the user takes the action of Enter in step S21.

The CPU 29 receives the signal indicative of the designation of FAVORITE GUIDE by way of the IR receiver 39, and the sequence proceeds to step S22 to initialize the argument i to 1. The sequence proceeds to step S23 to initialize the argument C of category to $C_1$. The sequence proceeds to step S24 to initialize the argument N, which indicates the small frame number for a received broadcasting channel, to 1.

The sequence proceeds to step S25, in which the CPU 29 sets the favorite program guide mode, reads out the favorite program guide list (shown in FIG. 12) from the ROM 38 to extract the N-th frequent channel (i.e., most-frequent channel) of category $C_i$ (i.e., $C_1$), and operates on the tuner 21B to receive that broadcasting channel.

The tuner 21B receives channel #35 in accordance with the favorite program guide list shown in FIG. 12, and feeds the received signal to the QPSK demodulation circuit 22B. The circuit 22B implements the QPSK demodulation for the signal and feeds the demodulated signal to the error correction circuit 23B. The circuit 23B implements the error correction for the signal and feeds the resulting signal to the demultiplexer 24. The demultiplexer 24 separates the video signal from the input signal and feeds the video signal to the MPEG video decoder 25B in the decoder module 44B. The MPEG video decoder 25B decodes the video signal by using the DRAM 25aB.

The decoded video signal is fed to the picture-in-picture processor 45 and stored in its memory. The processor 45 compresses the video signal provided by the decoder module 44B so that it is displayed in a small frame on the screen of the monitor unit 4.

Subsequent steps S26 through S29 test whether the operation knob 52 is operated in any of the right/left/up/down directions, the Escape key is pressed, or the operation knob 52 is depressed as the Enter key. If none of these operations is detected, the sequence proceeds to step S30 to test whether or not the argument N is the final value (5 in this embodiment). Unless the argument N is the final value, the sequence proceeds to step S31 to increment the N by 1 (N=2) and then returns to step S25.

In step S25, the CPU 29 extracts the N-th frequent channel (i.e., second frequent channel) of category $C_i$ (i.e., $C_1$) in the favorite program guide list shown in FIG. 12, and operates on the tuner 21B to receive broadcasting channel #36. The picture-in-picture processor 45 generates a small-frame picture of the received broadcasting channel, and the monitor unit 4 displays the picture.

These steps S25 through S31 are repeated, and small-frame pictures of five broadcasting channels of category $C_1$ are displayed on the monitor unit 4.

The step S30 now detects the argument N to be the final value, and the sequence proceeds to step S32 to decrement the N by 4 so that it is 1. The sequence returns to step S25. The process of these steps S25 through S32 is carried out repeatedly, and five small-frame pictures of category $C_1$ are displayed on the monitor unit 4.

Figure 16:
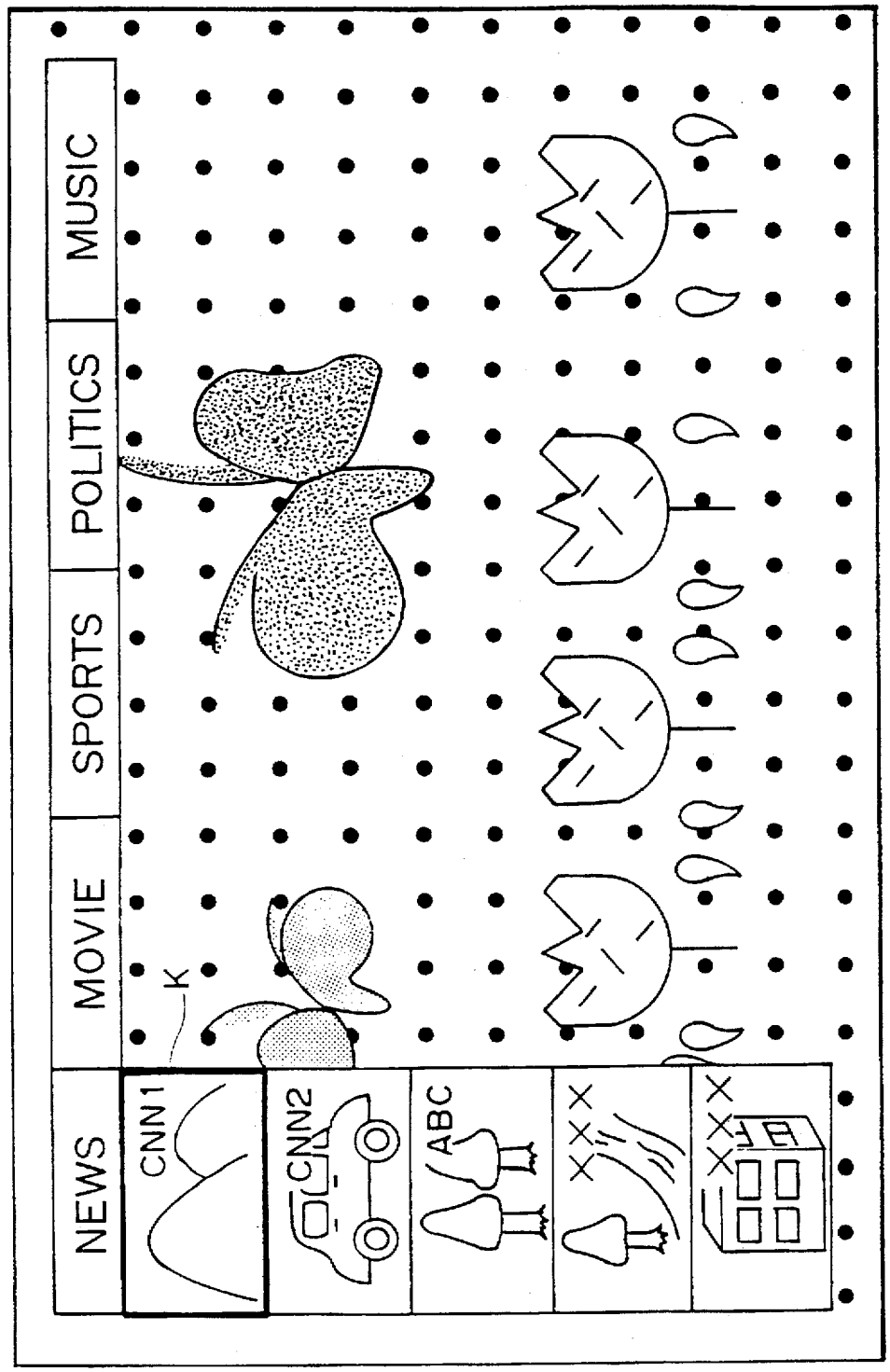
FIG. 16 is a diagram showing an example of a display of favorite program guidance.

FIG. 16 shows an example of display on the monitor unit 4. On the screen, five category labels that are NEWS, MOVIE, SPORTS, POLITICS and MUSIC are displayed on the top row of the monitor unit 4. Five small-frame pictures of broadcasting channels that belong to the leftmost category (i.e., NEWS) are displayed in the leftmost column of the screen. The MPEG video decoder 25B positions the cursor to the uppermost small frame.

With five small-frame pictures of a certain category being displayed, the user who intends to receive a broadcasting channel of other category tilts the operation knob 52 to the right or left. This operation is detected in step S26 of FIG. 14, and the control sequence proceeds to step S33 shown in FIG. 15 to rotate the category labels to the left or right accordingly. For example, when the operation knob 52 is tilted to the right, the category labels are rotated to the left by one category position (instead of the rightward movement of the cursor, the categories are moved to the left relative to the stationary cursor in this operating mode). As a result, the display of FIG. 16 on the monitor unit 4 is replaced with a display shown in FIG. 17.

Figure 17:
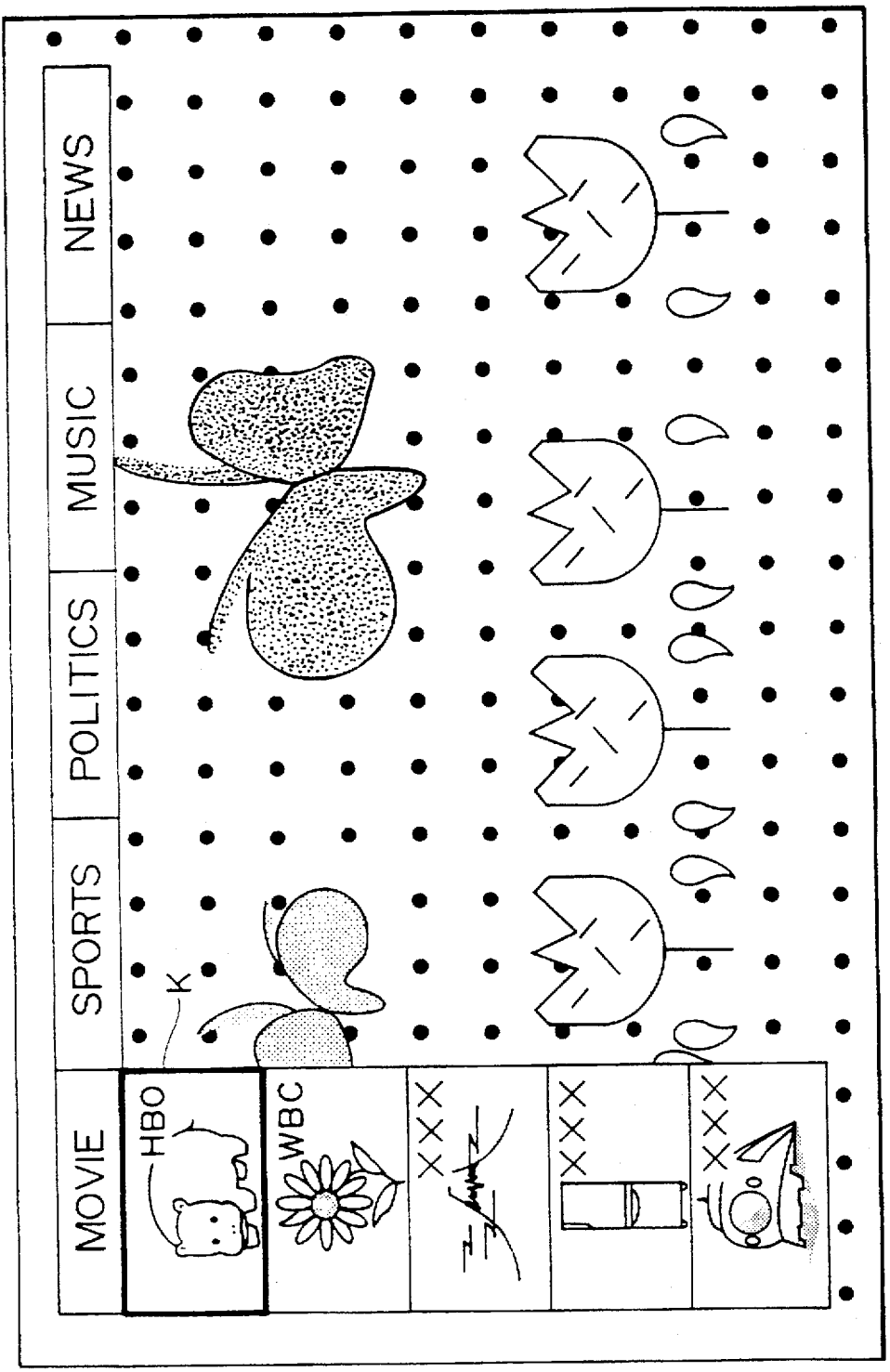
FIG. 17 is a diagram showing another example of a display of favorite program guidance.
Figure 18:
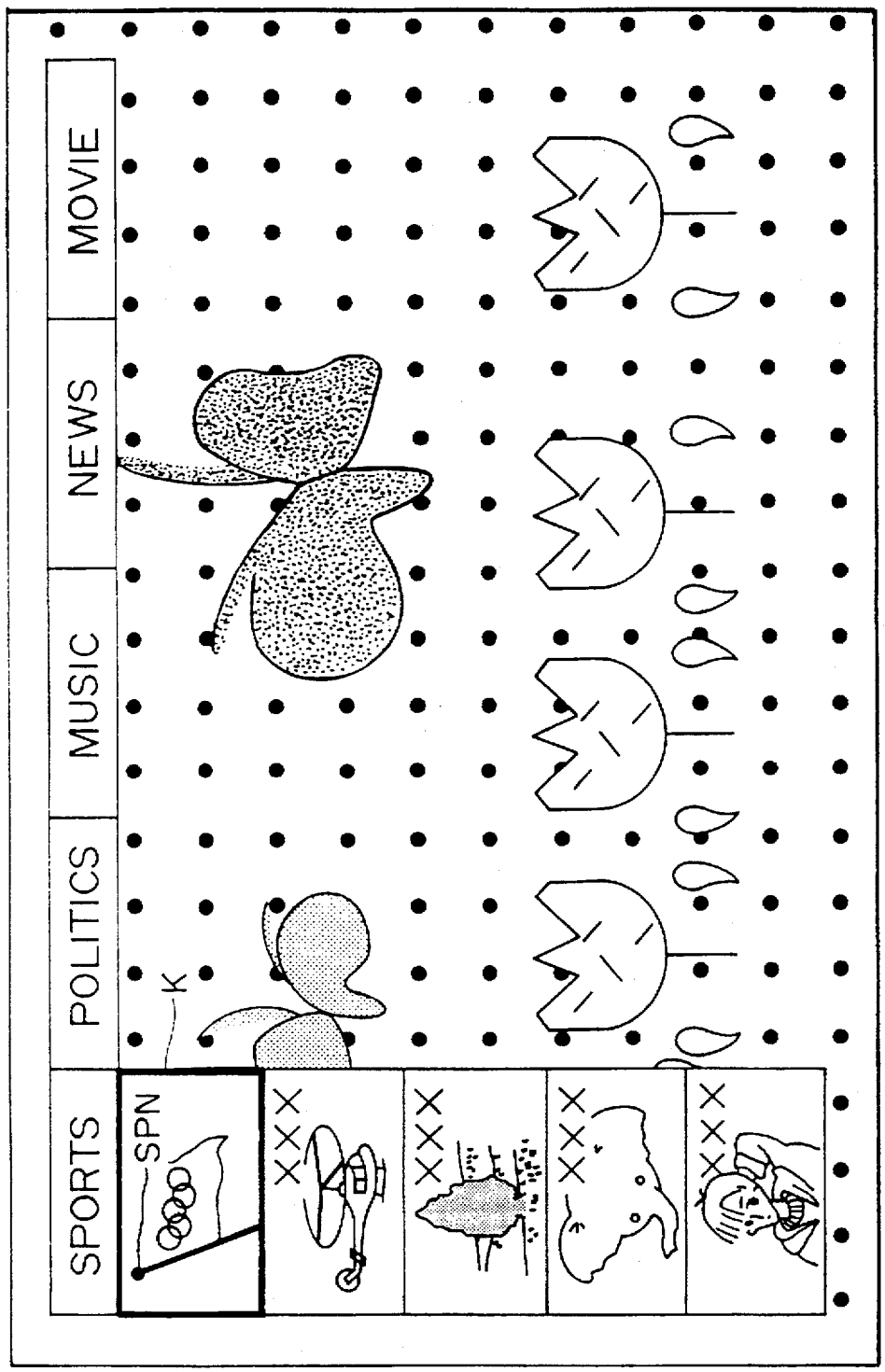
FIG. 18 is a diagram showing another example of a display of favorite program guidance.

If the user tilts the operation knob 52 to the right again in this state, the category labels are rotated to the left by one label position and the display of FIG. 17 is replaced with a display shown in FIG. 18. If the user tilts the operation knob 52 to the left in this state, the category labels are rotated to the right by one label position and the display of FIG. 17 is restored. If the user tilts the operation knob 52 to the left again in this state, the category labels are rotated to the right by one label position and the display of FIG. 16 is restored.

Figure 19:
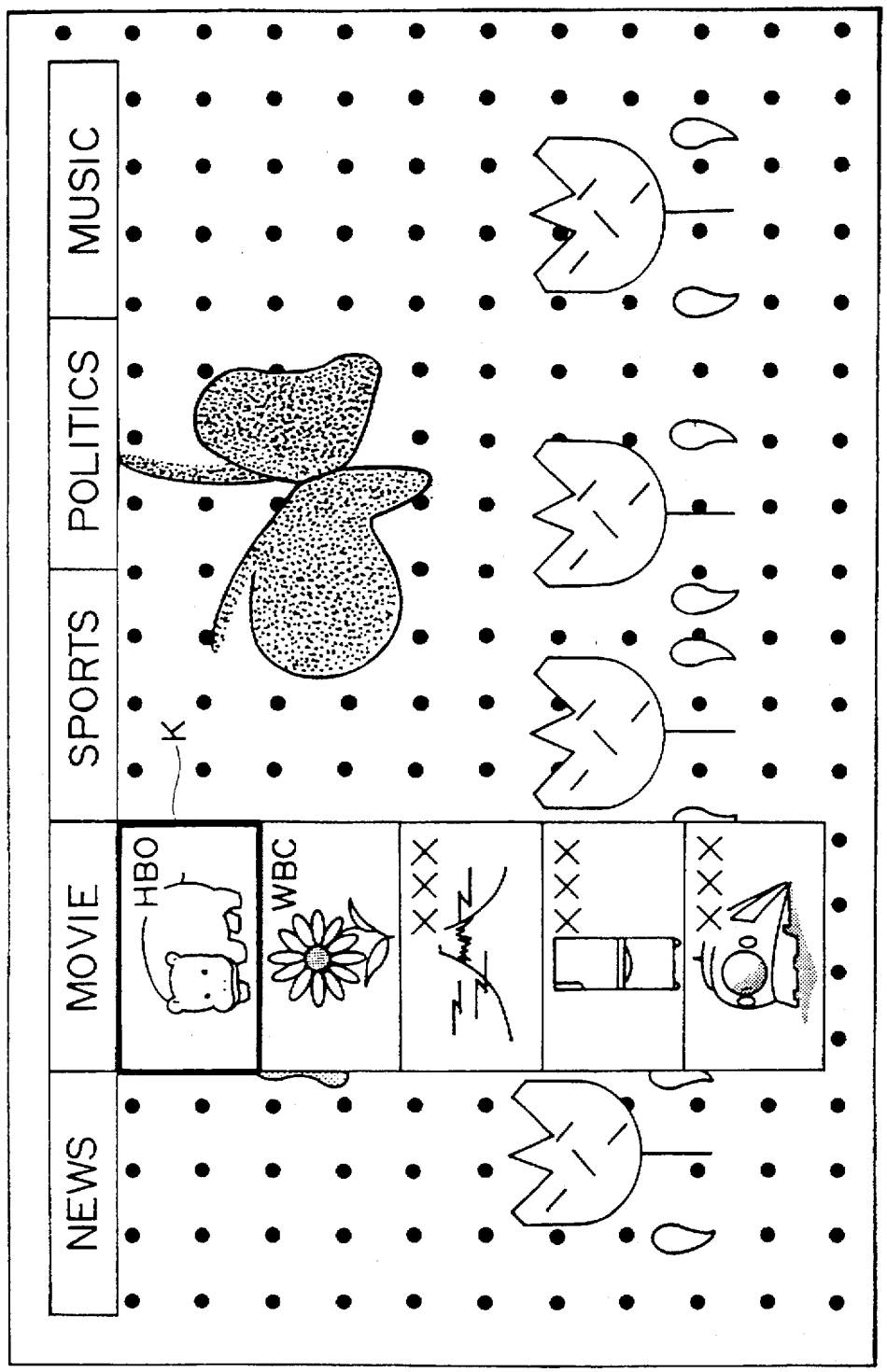
FIG. 19 is a diagram showing another example of a display of favorite program guidance.

It is possible even in this operating mode to move the cursor K right or left directly in response to the tilt direction of the operation knob 52, with the category labels being fixed, instead of rotating the category labels as described above. In this case, however, small-frame pictures of a designated category (e.g., MOVIE) will be displayed unfavorably over the main-frame picture as shown in FIG. 19.

After the category labels have been rotated to the left by the right-tilt (or to the right by the left-tilt) of the operation knob 52 in step S33, the sequence proceeds to step S34 to increment (or decrement) the argument i by 1. If the resulting argument i becomes greater than 5 or smaller than 1, the argument i is set to 1 or 5, respectively. The sequence returns to step S25 to proceed with the process described previously.

For example, after the operation knob 52 has been operated to rotate the category labels to the left for the display shown in FIG. 16, five small-frame pictures of channels #60, #93, #103, #3, and #7 of category MOVIE are displayed in the leftmost column of the screen as shown in FIG. 17. Similarly, after the category labels have been rotated to the left again to designate category SPORTS, small-frame pictures of channels #95, #2, #133, #134, and #59 are displayed in the leftmost column of the screen as shown in FIG. 18.

With five small-frame pictures of a designated category being displayed on the screen as a result of the foregoing operations, the user who intends to choose a small-frame picture tilts the operation knob 52 upward or downward. This operation is detected in step S27, and the sequence proceeds to step S35 shown in FIG. 15, in which the CPU 29 moves the cursor K up or down by one small-frame position in compliance with the tilt direction.

Figure 20:
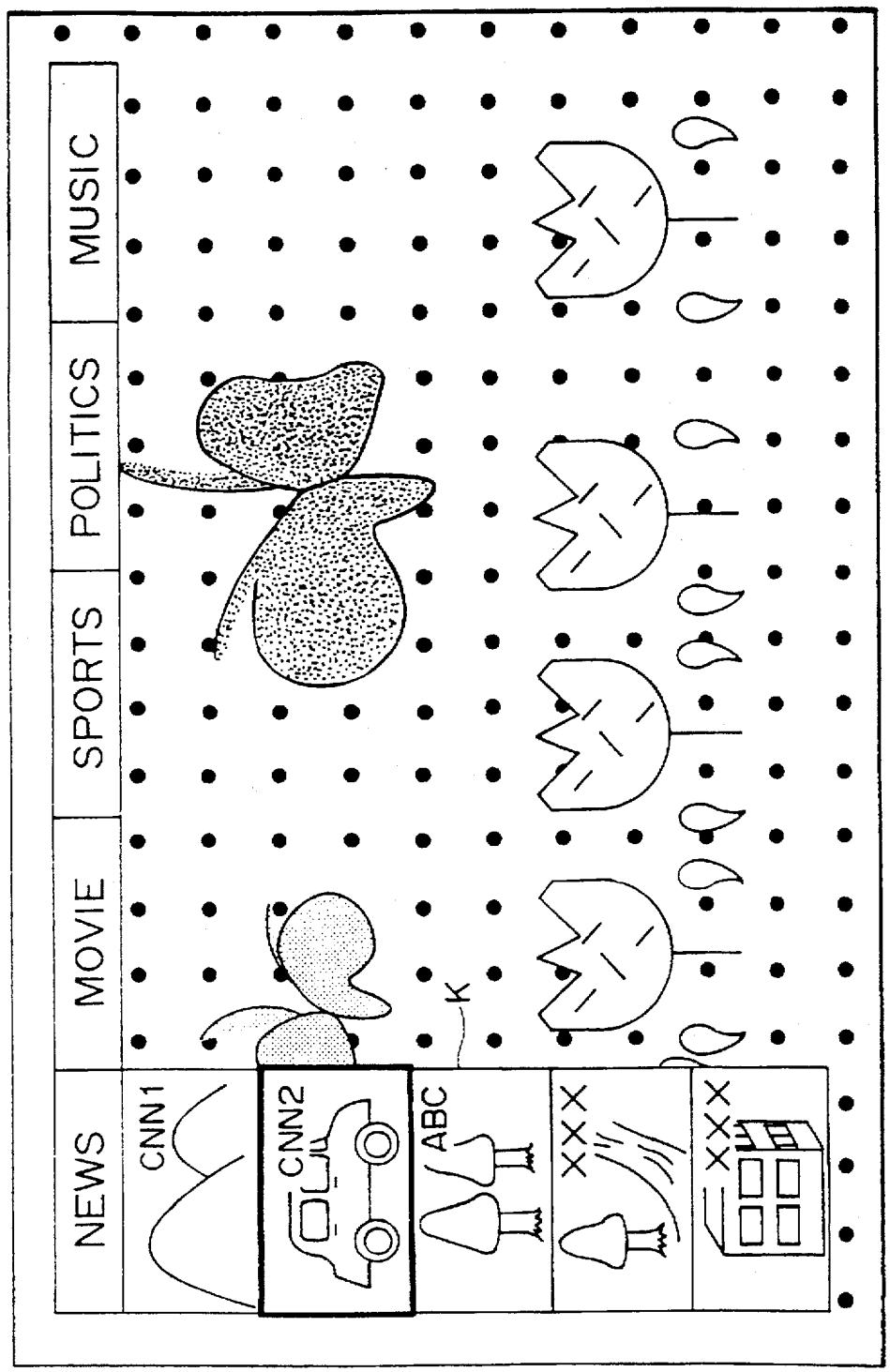
FIG. 20 is a diagram showing another example of a display of favorite program guidance.
Figure 21:
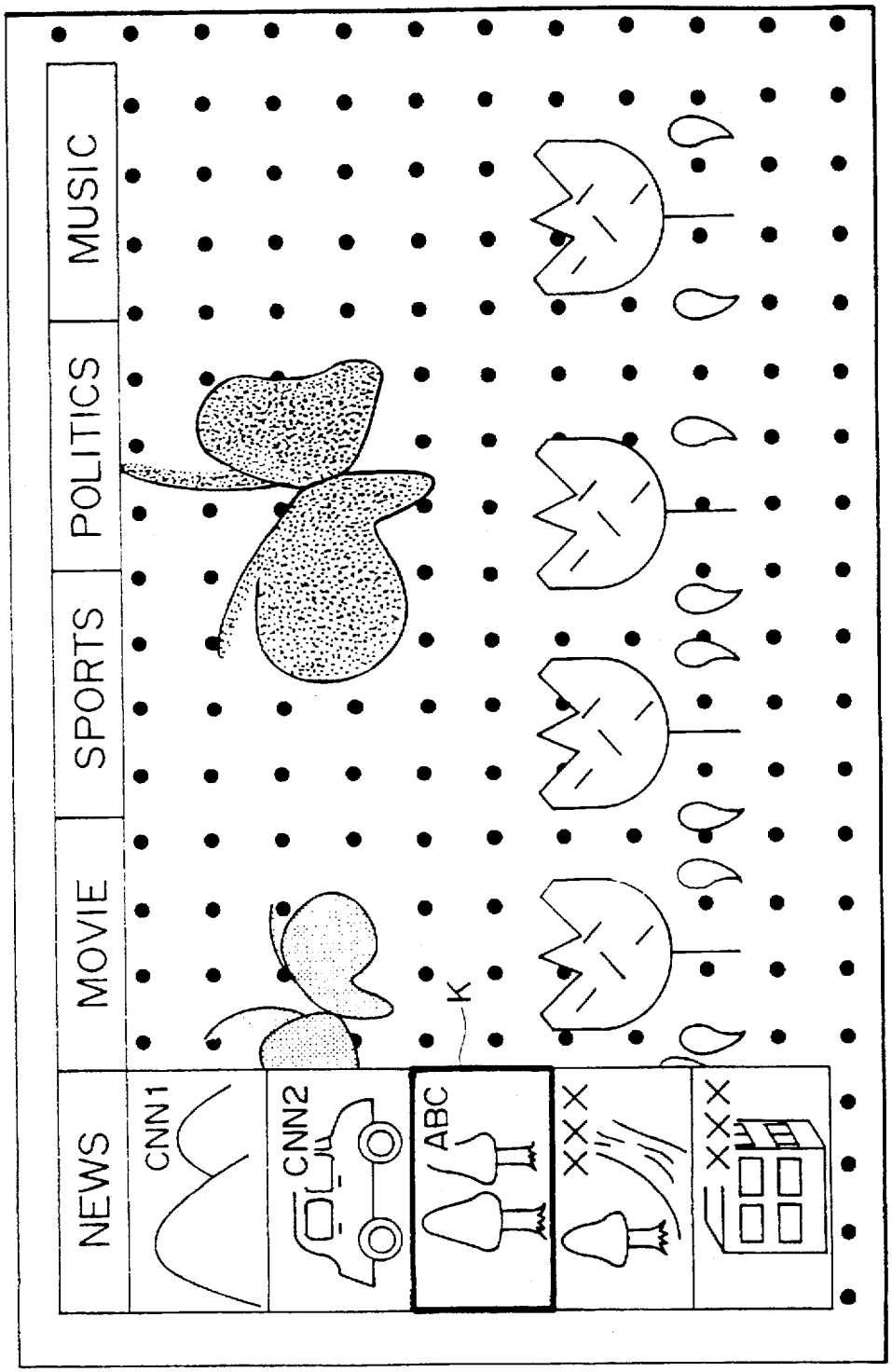
FIG. 21 is a diagram showing another example of a display of favorite program guidance.

For example, when the operation knob 52 is tilted downward, the cursor K is moved down by one small-frame position and the display of FIG. 16 is replaced with a display shown in FIG. 20. The sequence returns to step S25 to proceed with the process described previously. If the operation knob 52 is tilted downward again in this state, the cursor K is moved down by one small-frame position and the display of FIG. 20 is replaced with a display shown in FIG. 21. If the operation knob 52 is tilted upward in this state, the cursor K is moved up by one small-frame position and the display of FIG. 20 is restored. If the operation knob 52 is tilted upward again in this state, the cursor K is moved up by one small-frame position and the display of FIG. 16 is restored.

The user who cannot find a picture in one's favor among the small-frame pictures presses the Escape key 54. This operation is detected in step S28, and the sequence proceeds to step S36 of FIG. 15 to terminate the favorite program guide mode. The category labels and small-frame pictures go out, leaving only the main-frame picture.

The user, who intends to display on the main frame the small-frame picture pointed by the cursor K, depresses the operation knob 52 as the Enter key. This operation is detected in step S29, and the sequence proceeds to step S37 of FIG. 15, which implements the process for detecting the channel number of the small-frame picture pointed by the cursor K and displaying the picture of this broadcasting channel in the main frame.

Figure 22:
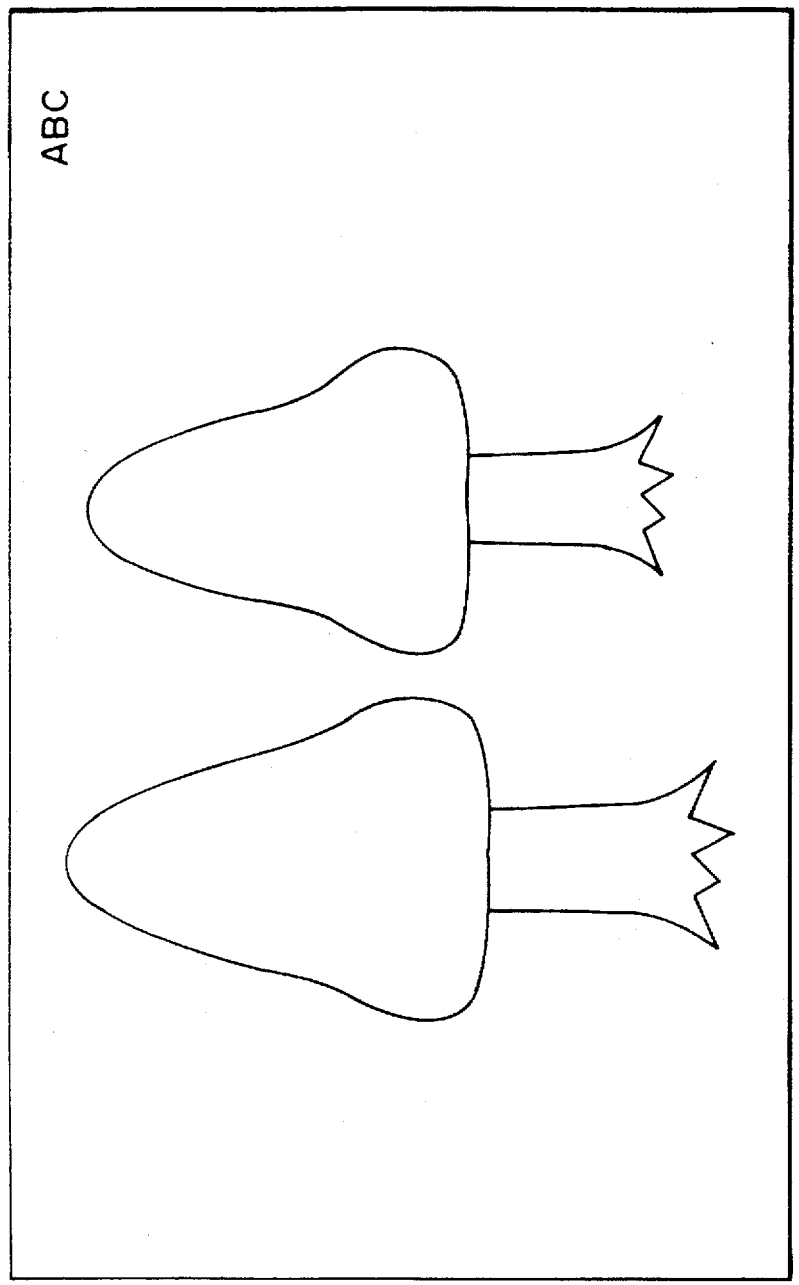
FIG. 22 is a diagram showing a display resulting from the Enter operation for the display shown in FIG. 21.

Specifically, the CPU 29 operates on the tuner 21A to receive the broadcasting channel of the detected channel number and operates on the tuner 21B to terminate the reception for the small frames. Consequently, the small-frame picture designated by the user with the cursor K is now displayed as a main-frame picture on the monitor unit 4. For example, when the Enter action is taken for the state of screen shown in FIG. 21, the broadcasting channel pointed by the cursor K (i.e., program of ABC) is received by the tuner 21A and it is displayed as a main-frame picture on the monitor unit 4 as shown in FIG. 22. The sequence proceeds to step S36 to terminate the favorite program guide mode.

According to this embodiment of invention, the user who tends to watch a program of a certain category (e.g., news) in a certain time band (e.g.,19:00-19:30) can choose a favorite program (news) quickly from among the categorized programs that have been received frequently in the past and are displayed in small frames.

Even in choosing a program of other category, the user can first confine programs to a certain category and next choose a favorite program within the category, and this program choosing procedure is quicker than choosing a program from among many programs of all categories displayed in many small frames.

Figure 23:
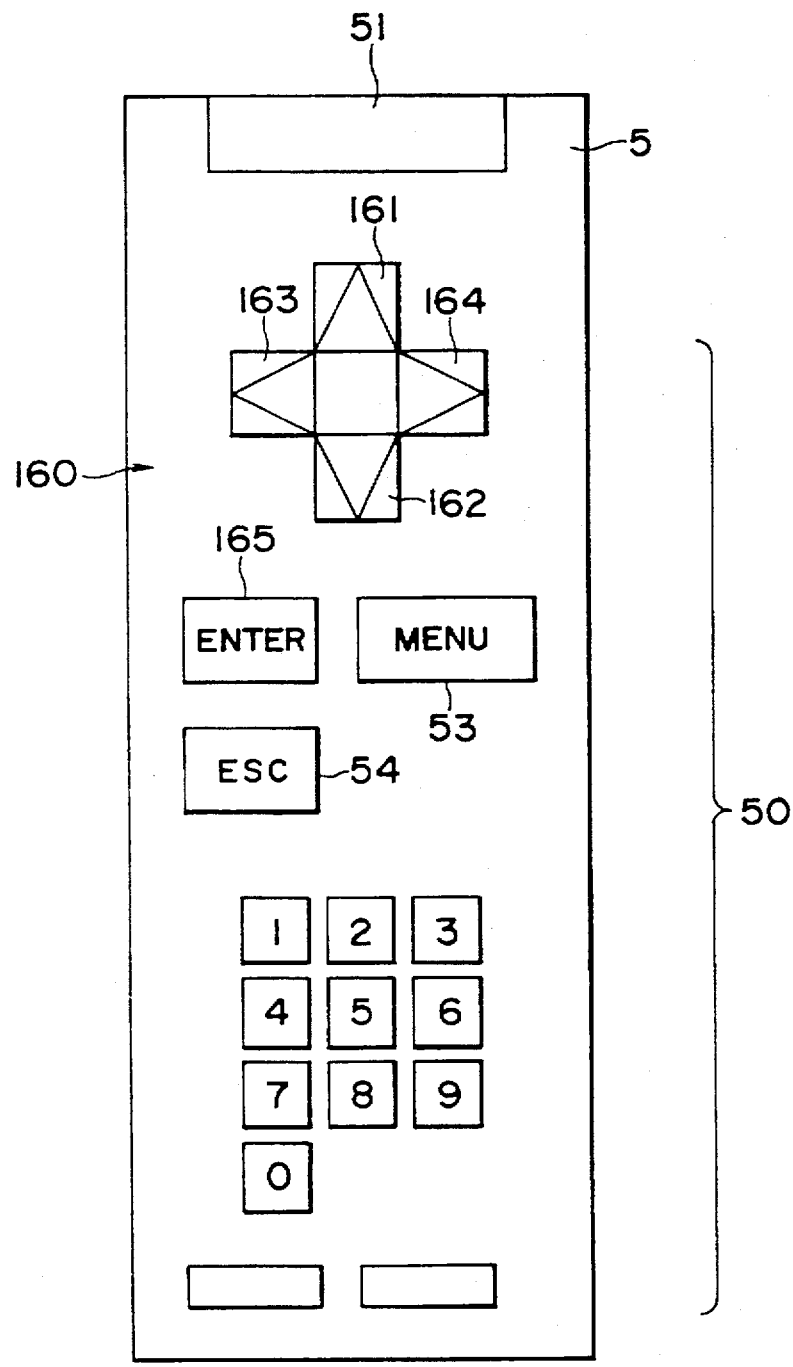
FIG. 23 is a plan view showing another embodiment of the remote commander 5.

FIG. 23 shows another embodiment of the remote commander 5. It has a set of direction keys 160 in place of the operation knob 52 of the remote commander 5 shown in FIG. 4. The direction key set 160 includes an Up key 161, Down key 162, Left key 163 and Right key 164, and these keys are used to move the cursor in the corresponding directions. This remote commander 5 further has an independent Enter key 165 which is used to effectuate the pointed item.

Figure 24:
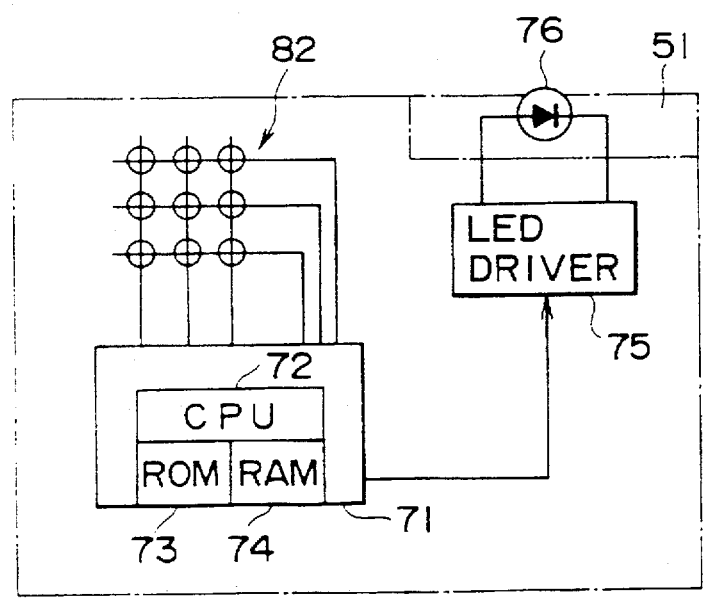
FIG. 24 is a block diagram showing the internal circuit arrangement of the remote commander 5 shown in FIG. 23.
Figure 25:
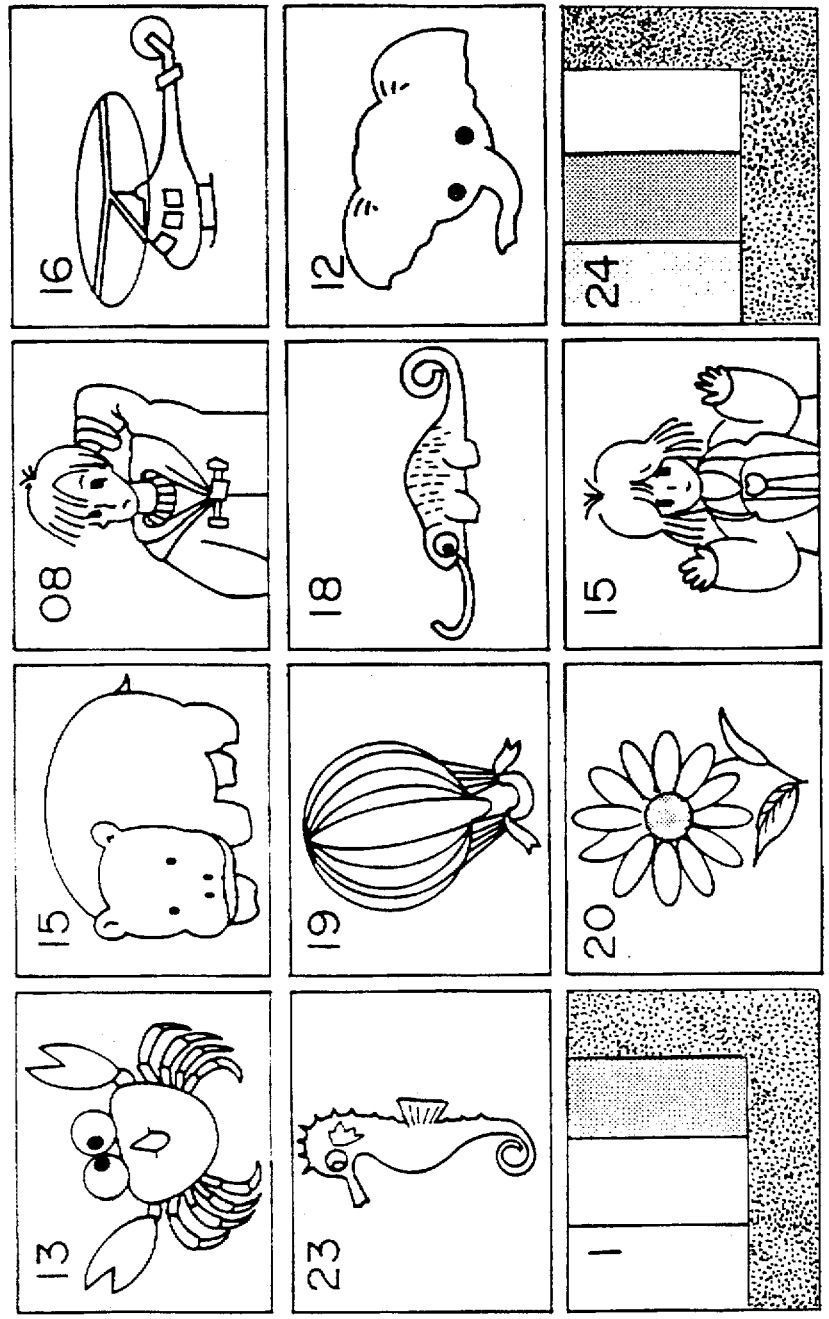
FIG. 25 is a diagram showing a display for choosing a broadcasting channel based on the conventional controller.

FIG. 24 shows the internal arrangement of the remote commander 5 shown in FIG. 23. Operations of all direction keys and Enter key are detected based on a key matrix configuration 82. Accordingly, the variable resistors 64 and 65, switch 66, and A/D converters 77 and 78 used in the former remote commander 5 shown in FIG. 10 are eliminated. The remaining arrangement is identical to that shown in FIG. 10.

The IRD 2, which is a separate device in the foregoing embodiment, can be incorporated in one of the other AV devices.

As described above, the image reception controller and the method of image reception control based on this invention are designed to display labels of categories and small-frame pictures of a category along the horizontal and vertical axes, respectively, or along the vertical and horizontal axes, respectively, so that the user chooses a category of program and next chooses a program within the category, whereby the user can choose a favorite program from among many broadcasting channels easily and swiftly.

What is claimed is:

1. An image reception controller, comprising:

reception means for receiving a specified broadcasting channel;

memory means for storing a record of reception of a plurality of broadcasting channels, inclusive of at least programming categories of said plurality of broadcasting channels received by said reception means in a prescribed period in the past;

reception control means for controlling said reception means to receive broadcasting channels of said plurality of broadcasting channels that belong to a category of said plurality of programming categories stored in the memory means in response to an external command of a selected operational mode; and display control means for displaying labels of said plurality of programming categories along one of the horizontal axis and vertical axis of the display screen and displaying pictures of the broadcasting channels of the category in small frames along the other of said horizontal axis and vertical axis in decreasing order of frequency of reception as indicated in said stored record of reception.

2. The image reception controller according to claim 1, wherein said display control means displays the category labels of said plurality of programming categories on one of a top row and a bottom row of the display screen and displays the small frames in one of a leftmost column and a rightmost column of the display screen.

3. The image reception controller according to claim 2, wherein said display control means includes means for displaying a cursor for pointing to the category label or the small frame to be selected.

4. The image reception controller according to claim 3, further comprising means operated by a user to move the cursor on the display screen.

5. The image reception controller according to claim 4, wherein said display control means includes means for moving the category labels in a horizontal direction in response to operation of said cursor moving means instead of moving the cursor in the horizontal direction.

6. The image reception controller according to claim 4 or 5, further comprising means operated by the user to designate for display the small frame that is pointed to by the cursor.

7. The image reception controller according to claim 6, wherein said cursor moving means and said small frame designation means are arranged for successive operation with one finger of the user.

8. A method of image reception control, comprising steps of:

storing a record of successive receptions of respective broadcasting channels, inclusive of at least programming categories of the broadcasting channels, which have been received over a prescribed time period in the past;

receiving broadcasting channels that belong to a selected programming category in the reception record in response to an external command of a selected operational mode; and displaying labels of the programming categories along one of the horizontal axis and vertical axis of the display screen and displaying pictures of the broadcasting channels of the selected programming category in small frames along the other of said horizontal axis and vertical axis in decreasing order of frequency of reception as indicated in said stored record of successive receptions.

* * * * *